United States Patent
Wang et al.

(10) Patent No.: US 12,499,557 B2
(45) Date of Patent: Dec. 16, 2025

(54) SYSTEMS AND METHODS FOR DETERMINING BLOOD VESSEL PARAMETERS

(71) Applicant: SHANGHAI UNITED IMAGING HEALTHCARE CO., LTD., Shanghai (CN)

(72) Inventors: Xiaodong Wang, Shanghai (CN); Yuxiang Guo, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 426 days.

(21) Appl. No.: 18/149,040

(22) Filed: Dec. 30, 2022

(65) Prior Publication Data

US 2023/0134402 A1   May 4, 2023

Related U.S. Application Data

(63) Continuation of application No. PCT/CN2020/138408, filed on Dec. 22, 2020.

(30) Foreign Application Priority Data

Jun. 30, 2020   (CN) .......................... 202010624356.8
Jul. 31, 2020   (CN) .......................... 202010761635.9

(51) Int. Cl.
  *G06T 7/149*   (2017.01)
  *A61B 5/02*   (2006.01)
  *G06T 7/00*   (2017.01)

(52) U.S. Cl.
  CPC .......... *G06T 7/149* (2017.01); *A61B 5/02007* (2013.01); *G06T 7/0012* (2013.01);
  (Continued)

(58) Field of Classification Search
  CPC .................. G06T 7/149; G06T 7/0012; G06T 2207/20081; G06T 2207/20084; G06T 2207/30104; A61B 5/02007
  See application file for complete search history.

(56) References Cited

U.S. PATENT DOCUMENTS 9,984,465 B1 * 5/2018 Ma ........................ G06T 7/0016
10,249,048 B1   4/2019 Wang et al.
(Continued)

FOREIGN PATENT DOCUMENTS

CN   106887000 A   6/2017
CN   108564574 A   9/2018
(Continued)

OTHER PUBLICATIONS

Charles A. Taylor et al., Computational Fluid Dynamics Applied to Cardiac Computed Tomography for Noninvasive Quantification of Fractional Flow Reserve, Journal of the American College of Cardiology, 61(22): 2233-2241, 2013.
(Continued)

*Primary Examiner* — Shefali D Goradia
(74) *Attorney, Agent, or Firm* — METIS IP LLC

(57) ABSTRACT

A method for determining blood vessel parameters is provided. The method may include obtaining a blood vessel image of a target blood vessel. The method may also include generating a blood vessel model of the target blood vessel based on the blood vessel image. The blood vessel model is a grid model. The method may further include determining at least one blood vessel parameter of the target blood vessel based at least on the blood vessel model.

16 Claims, 19 Drawing Sheets

(52) U.S. Cl.
CPC ............... *G06T 2207/20081* (2013.01); *G06T 2207/20084* (2013.01); *G06T 2207/30104* (2013.01)

(56) References Cited

U.S. PATENT DOCUMENTS

| | | | |
|---|---|---|---|
| 10,803,583 B2* | 10/2020 | Wang | G06V 10/764 |
| 12,207,961 B2* | 1/2025 | Liu | G06T 7/0016 |
| 2014/0058715 A1 | 2/2014 | Sharma et al. | |
| 2014/0073977 A1 | 3/2014 | Grady et al. | |
| 2015/0112182 A1 | 4/2015 | Sharma et al. | |
| 2016/0019363 A1 | 1/2016 | Watanabe et al. | |
| 2016/0328855 A1 | 11/2016 | Lay et al. | |
| 2018/0211386 A1 | 7/2018 | Ma et al. | |
| 2018/0211388 A1 | 7/2018 | Ma et al. | |
| 2018/0242856 A1 | 8/2018 | Onozawa et al. | |
| 2020/0098124 A1 | 3/2020 | Wang et al. | |
| 2020/0160509 A1 | 5/2020 | Pack et al. | |
| 2021/0042991 A1 | 2/2021 | Wei | |
| 2022/0414895 A1 | 12/2022 | Guo et al. | |

FOREIGN PATENT DOCUMENTS

| | | |
|---|---|---|
| CN | 108665449 A | 10/2018 |
| CN | 109064559 A | 12/2018 |
| CN | 109461138 A | 3/2019 |
| CN | 109524119 A | 3/2019 |
| CN | 109559326 A | 4/2019 |
| CN | 110070534 A | 7/2019 |
| CN | 110634572 A | 12/2019 |
| CN | 111297388 A | 6/2020 |
| CN | 111815598 A | 10/2020 |
| CN | 112001893 A | 11/2020 |
| WO | 2015059706 A2 | 4/2015 |

OTHER PUBLICATIONS

J. Min et al., Gender-Specific Diagnostic Performance of Noninvasive Fractional Flow Reserve Derived from Coronary CT Angiograms: Results from the Prospective Multicenter DISCOVER-FLOW Study, Heart, Lung and Circulation, 21: S206, 2012.
Qi, Xiaolong et al., Virtual Hepatic Venous Pressure Gradient with CT Angiography (CHESS 1601): A Prospective Multicenter Study for the Noninvasive Diagnosis of Portal Hypertension, Radiology, 1-8, 2019.
B. Su et al., Numerical Modeling of Blood Flow in Patient-Specific Right Ventricle with Pulmonary Arterial Hypertension Based on MRI, International Conference for Innovation in Biomedical Engineering and Life Sciences, 56: 175-178, 2016.
Lucian Itu et al., A machine-learning approach for computation of fractional flow reserve from coronary computed tomography, Journal of Applied Physiology, 121: 42-52, 2016.
International Search Report in PCT/CN2020/138408 mailed on Mar. 25, 2021, 4 pages.
Written Opinion in PCT/CN2020/138408 mailed on Mar. 26, 2021, 5 pages.
First Office Action in Chinese Application No. 202010761635.9 mailed on Jul. 18, 2023, 20 pages.
First Office Action in Chinese Application No. 202010624356.8 mailed on Jul. 22, 2023, 19 pages.
Xu, Mengjia et al., Survey of Hemodynamics Simulation for Diagnosis and Prediction in Vascular Disease, Journal of Image and Graphics, 20(3): 0297-0310, 2015.

* cited by examiner

1510

1520

1610

1620

SYSTEMS AND METHODS FOR DETERMINING BLOOD VESSEL PARAMETERS

CROSS-REFERENCE TO RELATED APPLICATIONS

This application is a Continuation of International Application No. PCT/CN2020/138408, filed on Dec. 22, 2020, which claims priority to Chinese Patent Application No. 202010624356.8, filed on Jun. 30, 2020, and Chinese Patent Application No. 202010761635.9, filed on Jul. 31, 2020, the contents of each of which are hereby incorporated by reference.

TECHNICAL FIELD

The present disclosure generally relates to systems and methods for determining blood vessel parameters, and more particularly, to systems and methods for determining blood vessel parameters using a trained model.

BACKGROUND

Blood vessels are one of the most important organs of a human body. A blood vessel imaging technology including, e.g., magnetic resonance imaging (MRI), computed tomography (CT), etc., are widely used in the diagnosis of various vascular diseases, such as calcification, stenosis, aneurysms, etc.

SUMMARY

According to an aspect of the present disclosure, a method for determining blood vessel parameters may be provided. The method may include obtaining a blood vessel image of a target blood vessel. The method may also include generating a blood vessel model of the target blood vessel based on the blood vessel image. The blood vessel model may be a grid model. The method may further include determining at least one blood vessel parameter of the target blood vessel based at least on the blood vessel model.

In some embodiments, the method may include determining at least one model parameter of the blood vessel model based on feature information of the target blood vessel. The method may further include generating the blood vessel model by performing a grid division on the blood vessel image based on the at least one model parameter.

In some embodiments, the feature information of the target blood vessel may include at least one of a type of the target blood vessel, a diameter of the target blood vessel, or a curvature of the target blood vessel.

In some embodiments, the method may include obtaining at least one blood flow parameter of the target blood vessel. The method may further include determining the at least one blood vessel parameter of the target blood vessel using a first trained model based on the blood vessel model and the at least one blood flow parameter.

In some embodiments, the method may include obtaining at least one first grid node and at least one second grid node of the blood vessel model. The method may also include determining an initial value of the at least one first grid node based on the at least one blood flow parameter. The method may also include determine an initial value of the at least one second grid node based on a preset value. The method may further include generating a preprocessed blood vessel model by preprocessing the blood vessel model based on the initial value of the at least one first grid node and the initial value of the at least one second grid node. The method may further include determining the at least one blood vessel parameter of the target blood vessel using the first trained model based on the preprocessed blood vessel model.

In some embodiments, the first trained model may be a graph neural network model.

In some embodiments, the blood flow parameter may include at least one of a blood density, a blood viscosity, an average blood flow velocity, an average blood flow volume, a blood pressure, or a cardiac output.

In some embodiments, the method may include obtaining a plurality of groups of first training samples. Each group of the plurality of groups of first training samples may include a preprocessed sample blood vessel model of a sample blood vessel and at least one reference blood vessel parameter of the sample blood vessel. The method may further include generating the first trained model by training a first preliminary model using the plurality of groups of first training samples.

In some embodiments, for each group of the plurality of groups of first training samples, the method may include obtaining a sample blood vessel image of the sample blood vessel. The method may also include determining a sample blood vessel model of the sample blood vessel based on the sample blood vessel image. The method may further include obtaining at least one sample blood flow parameter of the sample blood vessel. The method may further include generating the preprocessed sample blood vessel model by preprocessing the sample blood vessel model based on the at least one sample blood flow parameter.

In some embodiments, the method may further include determining the at least one reference blood vessel parameter of the sample blood vessel based on the sample blood vessel model and the at least one sample blood flow parameter according to a first predetermined algorithm.

In some embodiments, the first predetermined algorithm may include a computational fluid dynamics algorithm.

In some embodiments, the blood vessel parameter may include at least one of a blood pressure, a blood flow volume, a blood vessel wall shear stress, a blood flow velocity, a blood flow direction, a blood flow resistance, or a center line of the target blood vessel.

In some embodiments, the method may include determining a mathematical expression corresponding to the blood vessel model. The method may further include determining the at least one blood vessel parameter of the target blood vessel using a second trained model based on the mathematical expression.

In some embodiments, the method may include determining the mathematical expression corresponding to the blood vessel model by performing a numerical processing operation on the blood vessel model.

In some embodiments, the blood vessel model may be a structured grid model.

In some embodiments, the method may include dividing the structured grid model into at least one first layer along an axial direction of the blood vessel model. The at least one first layer may include a plurality of first grids. The method may further include determining the mathematical expression based on first coordinate information of the plurality of first grids of the at least one first layer.

In some embodiments, the blood vessel model may be a structured surface grid model. The method may include, for each of the at least one first layer, determining a layer vector corresponding to the first layer based on the first coordinate information of the plurality of first grids of the first layer.

The method may further include determining a vector matrix corresponding to the blood vessel model based on at least one layer vector corresponding to the at least one first layer.

In some embodiments, the blood vessel model may be a structured volume grid model. Each first layer may include a plurality of rows of grids. The method may include, for each row of the plurality of rows in each first layer, determining a row vector corresponding to the row based on the first coordinate information of the plurality of first grids of the row. The method may include, for each first layer of the at least one first layer, determining a layer vector matrix corresponding to the first layer based on a plurality of row vectors corresponding to the plurality of rows in the first layer. The method may further include determining a vector matrix corresponding to the blood vessel model based on at least one layer vector matrix corresponding to the at least one first layer.

In some embodiments, the method may further include determining whether a count of elements in each row vector in each first layer is the same. In response to determining that a count of elements in a row vector in a first layer is different from other row vectors in the first layer, the method may further include complementing the elements in the row vector such that the count of elements in each row vector in the each first layer is the same.

In some embodiments, the blood vessel model may be an unstructured grid model. The method may include mapping the unstructured grid model to a structured grid model. The method may also include dividing the structured grid model into at least one second layer along an axial direction of the structured grid model. The at least one second layer may include a plurality of second grids. The method may further include determining the mathematical expression based on second coordinate information of the plurality of second grids of the at least one second layer.

In some embodiments, the blood vessel model may be an unstructured grid model. The unstructured grid model may include a plurality of third grids. The method may include determining the mathematical expression based on third coordinate information of the plurality of third grids.

In some embodiments, the method may include determining the at least one blood vessel parameter of the target blood vessel by inputting the mathematical expression into the second trained model.

In some embodiments, the method may include obtaining at least one blood flow parameter of the target blood vessel. The method may further include determining the at least one blood vessel parameter of the target blood vessel by inputting the mathematical expression and the at least one blood flow parameter into the second trained model.

In some embodiments, the method may include obtaining a plurality of groups of second training samples. Each group of the plurality of groups of second training samples may include a sample mathematical expression corresponding to a sample blood vessel model of a sample blood vessel and at least one reference blood vessel parameter of the sample blood vessel. The method may further include generating the second trained model by training a second preliminary model using the plurality of groups of second training samples.

In some embodiments, the method may include, for each group of the plurality of groups of second training samples, obtaining a sample blood vessel image of the sample blood vessel. The method may also include determining a sample blood vessel model of the sample blood vessel based on the sample blood vessel image. The method may further include determining a sample mathematical expression corresponding to the sample blood vessel model.

In some embodiments, the method may further include determining the at least one reference blood vessel parameter of the sample blood vessel based on the sample blood vessel model and at least one sample blood flow parameter of the sample blood vessel according to a second predetermined algorithm.

In some embodiments, the second predetermined algorithm may include a computational fluid dynamics algorithm.

According to another aspect of the present disclosure, a system for determining blood vessel parameters may be provided. The system may include one or more storage devices and one or more processors configured to communicate with the one or more storage devices. The one or more storage devices may store executable instructions. When the one or more processors execute the executable instructions, the one or more processors may be directed to cause the system to perform a method. The method may include obtaining a blood vessel image of a target blood vessel. The method may also include generating a blood vessel model of the target blood vessel based on the blood vessel image. The blood vessel model may be a grid model. The method may further include determining at least one blood vessel parameter of the target blood vessel based at least on the blood vessel model.

According to yet another aspect of the present disclosure, a non-transitory computer readable medium may be provided. The non-transitory computer readable may include at least one set of instructions for determining blood vessel parameters. When executed by one or more processors of a computing device, the at least one set of instructions may cause the computing device to perform a method. The method may include obtaining a blood vessel image of a target blood vessel. The method may also include generating a blood vessel model of the target blood vessel based on the blood vessel image. The blood vessel model may be a grid model. The method may further include determining at least one blood vessel parameter of the target blood vessel based at least on the blood vessel model.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
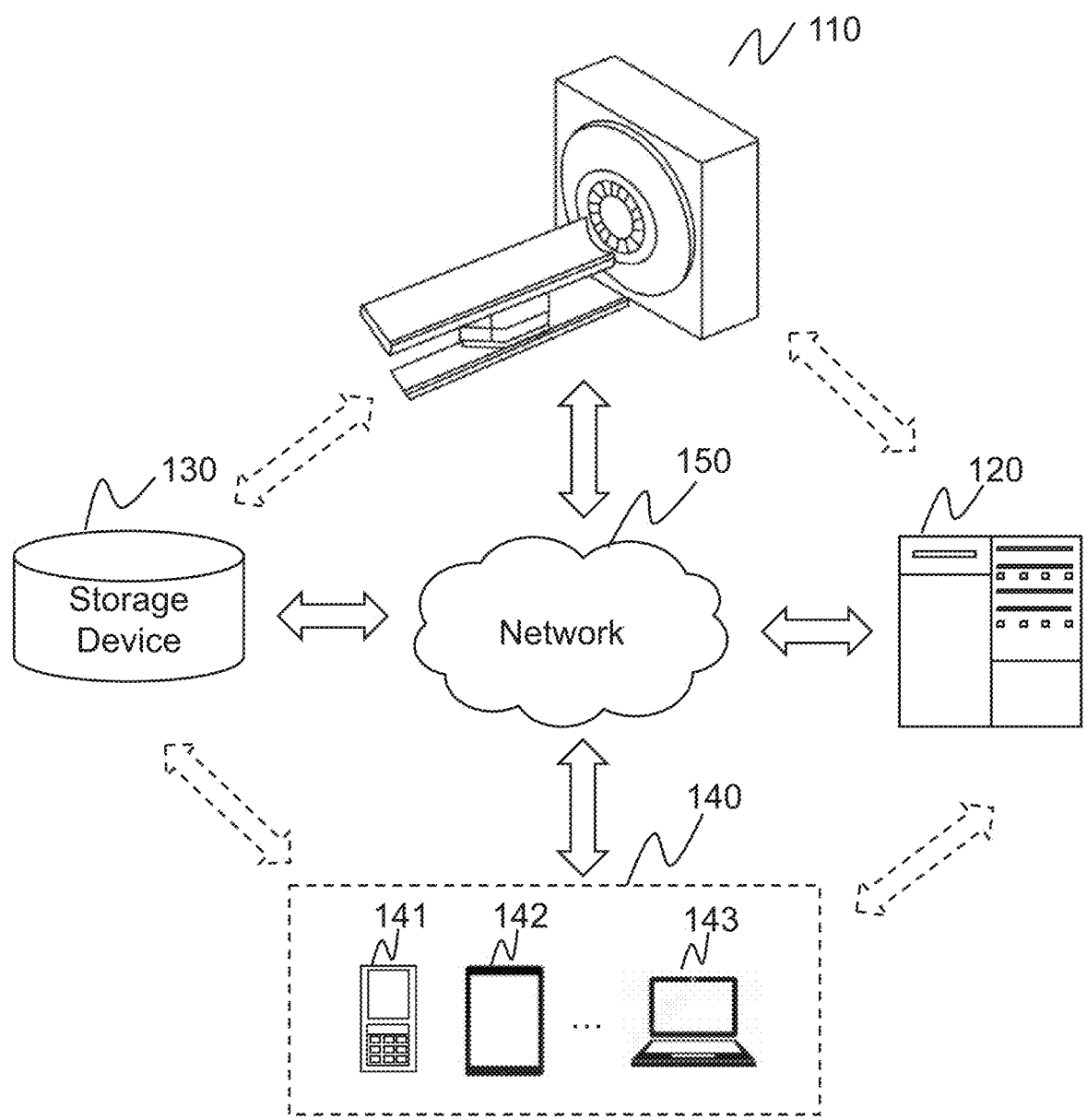
FIG. 1 is a schematic diagram illustrating an exemplary medical system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Also, the term "exemplary" is intended to refer to an example or illustration.

It will be understood that the terms "system," "engine," "unit," "module," and/or "block" used herein are one method to distinguish different components, elements, parts, sections or assembly of different levels in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that, although the terms "first," "second," "third," etc., may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

Spatial and functional relationships between elements are described using various terms, including "connected," "attached," and "mounted." Unless explicitly described as being "direct," when a relationship between first and second elements is described in the present disclosure, that relationship includes a direct relationship where no other intervening elements are present between the first and second elements, and also an indirect relationship where one or more intervening elements are present (either spatially or functionally) between the first and second elements. In contrast, when an element is referred to as being "directly" connected, attached, or positioned to another element, there are no intervening elements present. Other words used to describe the relationship between elements should be interpreted in a like fashion (e.g., "between," versus "directly between," "adjacent," versus "directly adjacent," etc.).

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The term "image" in the present disclosure is used to collectively refer to image data (e.g., scan data, projection data) and/or images of various forms, including a two-dimensional (2D) image, a three-dimensional (3D) image, a four-dimensional (4D), etc. The term "pixel" and "voxel" in the present disclosure are used interchangeably to refer to an element of an image. The term "anatomical structure" in the present disclosure may refer to gas (e.g., air), liquid (e.g., water), solid (e.g., stone), cell, tissue, organ of a subject, or any combination thereof, which may be displayed in an image and really exist in or on the subject's body. The term "region," "location," and "area" in the present disclosure may refer to a location of an anatomical structure shown in the image or an actual location of the anatomical structure existing in or on the subject's body, since the image may indicate the actual location of a certain anatomical structure existing in or on the subject's body. The term "an image of a subject" may be referred to as the subject for brevity.

An aspect of the present disclosure relates to systems and methods for determining blood vessel parameters. A processing device may obtain a blood vessel image of a target blood vessel. The processing device may generate a blood vessel model of the target blood vessel based on the blood vessel image. For example, the processing device may perform a grid division on the blood vessel image to generate the blood vessel model. The processing device may determine at least one blood vessel parameter of the target blood vessel based on the blood vessel model. For example, the processing device may determine the at least one blood vessel parameter of the target blood vessel based on the blood vessel model and at least one blood flow parameter using a first trained model (e.g., a graph neural network model). As another example, the processing device may determine a mathematical expression corresponding to the blood vessel model, and determine the at least one blood vessel parameter of the target blood vessel based on the mathematical expression using a second trained model.

Compared with a blood vessel parameter determination approach that directly uses a computational fluid dynamics (CFD) algorithm to determine blood vessel parameters based on a blood vessel image, the systems and methods as disclosed herein may simplify the blood vessel parameter determination process by inputting the blood vessel model into the first trained model or inputting the mathematical expression corresponding to the blood vessel model into the second trained model, and reduce the requirement for the grid quality and boundary conditions of the blood vessel model. Thus, the efficiency and/or accuracy of the blood vessel parameter determination may further be improved. In addition, in a training process of the first trained model or the second trained model, one or more reference blood vessel parameters of a sample blood vessel determined based on a sample blood vessel model and at least one sample blood flow parameter of the sample blood vessel according to the CFD algorithm may be used as a ground truth, thereby incorporating the benefits of the CFD algorithm in and improving the accuracy of the first trained model or the second trained model.

FIG. 1 is a schematic diagram illustrating an exemplary medical system according to some embodiments of the present disclosure. As illustrated in FIG. 1, the medical system 100 may include a medical device 110, a processing device 120, a storage device 130, a terminal device 140, and a network 150. In some embodiments, two or more components of the medical system 100 may be connected to and/or communicate with each other via a wireless connection, a wired connection, or a combination thereof. The medical system 100 may include various types of connection between its components. For example, the medical device 110 may be connected to the processing device 120 through the network 150, or connected to the processing device 120 directly as illustrated by the bidirectional dotted arrow connecting the medical device 110 and the processing device 120 in FIG. 1. As another example, the terminal device 140 may be connected to the processing device 120 through the network 150, or connected to the processing device 120 directly as illustrated by the bidirectional dotted arrow connecting the terminal device 140 and the processing device 120 in FIG. 1. As still another example, the storage device 130 may be connected to the medical device 110 through the network 150, or connected to the medical device 110 directly as illustrated by the bidirectional dotted arrow connecting the medical device 110 and the storage device 130 in FIG. 1. As still another example, the storage device 130 may be connected to the terminal device 140 through the network 150, or connected to the terminal device 140 directly as illustrated by the bidirectional dotted arrow connecting the terminal device 140 and the storage device 130 in FIG. 1.

The medical device 110 may be configured to acquire imaging data relating to a subject. The imaging data relating to a subject may include an image (e.g., an image slice), projection data, or a combination thereof. In some embodiments, the imaging data may be a two-dimensional (2D) imaging data, a three-dimensional (3D) imaging data, a four-dimensional (4D) imaging data, or the like, or any combination thereof. The subject may be biological or non-biological. For example, the subject may include a patient, a man-made object, etc. As another example, the subject may include a specific portion, an organ, and/or tissue of the patient. Specifically, the subject may include the head, the neck, the thorax, the heart, the stomach, a blood vessel, soft tissue, a tumor, or the like, or any combination thereof. In the present disclosure, "object" and "subject" are used interchangeably.

In some embodiments, the medical device 110 may include a single modality imaging device. For example, the medical device 110 may include a positron emission tomography (PET) device, a single-photon emission computed tomography (SPECT) device, a magnetic resonance imaging (MRI) device (also referred to as an MR device, an MR scanner), a computed tomography (CT) device, an ultrasound (US) device, an X-ray imaging device, a digital subtraction angiography (DSA) device, a magnetic resonance angiography (MRA) device, a computed tomography angiography (CTA) device, or the like, or any combination thereof. In some embodiments, the medical device 110 may include a multi-modality imaging device. Exemplary multi-modality imaging devices may include a PET-CT device, a PET-MRI device, a SPET-CT device, or the like, or any combination thereof. The multi-modality imaging device may perform multi-modality imaging simultaneously. For example, the PET-CT device may generate structural X-ray CT data and functional PET data simultaneously in a single scan. The PET-MRI device may generate MRI data and PET data simultaneously in a single scan.

In some embodiments, the medical device 110 may transmit the image(s) via the network 150 to the processing device 120, the storage device 130, and/or the terminal device 140. For example, the image(s) may be sent to the processing device 120 for further processing or may be stored in the storage device 130.

The processing device 120 may process data and/or information. The data and/or information may be obtained from the medical device 110 or retrieved from the storage device 130, the terminal device 140, and/or an external device (external to the medical system 100) via the network 150. For example, the processing device 120 may obtain an original image of a target blood vessel. As another example, the processing device 120 may determine a portion of an original image including a target blood vessel as a blood vessel image. As still another example, the processing device 120 may generate a blood vessel model of a target blood vessel based on a blood vessel image. As still another example, the processing device 120 may determine at least one blood vessel parameter of a target blood vessel based at least on a blood vessel model. In some embodiments, the processing device 120 may be a single server or a server group. The server group may be centralized or distributed. In some embodiments, the processing device 120 may be local or remote. For example, the processing device 120 may access information and/or data from the medical device 110, the storage device 130, and/or the terminal device 140 via the network 150. As another example, the processing device 120 may be directly connected to the medical device 110, the terminal device 140, and/or the storage device 130 to access information and/or data. In some embodiments, the processing device 120 may be implemented on a cloud platform. For example, the cloud platform may include a private cloud, a public cloud, a hybrid cloud, a community cloud, a distributed cloud, an inter-cloud, a multi-cloud, or the like, or any combination thereof. In some embodiments, the processing device 120 may be part of the terminal device 140. In some embodiments, the processing device 120 may be part of the medical device 110. In some embodiments, other hardware and/or software modules may be used in conjunction with the processing device 120, including but not limited to a microcode, a device driver, a redundant processing unit, an external disk drive array, a RAID system, a tape drive, and a data backup storage system.

The storage device 130 may store data, instructions, and/or any other information. In some embodiments, the storage device 130 may store data obtained from the medical device 110, the processing device 120, and/or the terminal device 140. The data may include image data acquired by the processing device 120, algorithms and/or models for processing the image data, etc. For example, the storage device 130 may store an original image of a target blood vessel obtained from a medical device (e.g., the medical device 110). As another example, the storage device 130 may store a blood vessel image of a target blood vessel determined by the processing device 120. As still another example, the storage device 130 may store a blood vessel model of a target blood vessel determined by the processing device 120. As still another example, the storage device 130 may store at least one blood vessel parameter of a target blood vessel determined by the processing device 120. In some embodiments, the storage device 130 may store data and/or instructions that the processing device 120, and/or the terminal device 140 may execute or use to perform exemplary methods described in the present disclosure. In some embodiments, the storage device 130 may include a mass storage, a removable storage, a volatile read-and-write memory, a read-only memory (ROM), or the like, or any combination thereof. Exemplary mass storages may include a magnetic disk, an optical disk, a solid-state drive, etc. Exemplary removable storages may include a flash drive, a floppy disk, an optical disk, a memory card, a zip disk, a magnetic tape, etc. Exemplary volatile read-and-write memories may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more other components in the medical system 100 (e.g., the processing device 120, the terminal device 140). One or more components in the medical system 100 may access the data or instructions stored in the storage device 130 via the network 150. In some embodiments, the storage device 130 may be integrated into the medical device 110 or the terminal device 140.

The terminal device 140 may be connected to and/or communicate with the medical device 110, the processing device 120, and/or the storage device 130. In some embodiments, the terminal device 140 may include a mobile device 141, a tablet computer 142, a laptop computer 143, or the like, or any combination thereof. For example, the mobile device 141 may include a mobile phone, a personal digital assistant (PDA), a gaming device, a navigation device, a point of sale (POS) device, a laptop, a tablet computer, a desktop, or the like, or any combination thereof. In some embodiments, the terminal device 140 may include an input device, an output device, etc. The input device may include alphanumeric and other keys that may be input via a keyboard, a touchscreen (for example, with haptics or tactile feedback), a speech input, an eye tracking input, a brain monitoring system, or any other comparable input mechanism. Other types of the input device may include a cursor control device, such as a mouse, a trackball, or cursor direction keys, etc. The output device may include a display, a printer, or the like, or any combination thereof.

The network 150 may include any suitable network that can facilitate the exchange of information and/or data for the medical system 100. In some embodiments, one or more components of the medical system 100 (e.g., the medical device 110, the processing device 120, the storage device 130, the terminal device 140, etc.) may communicate information and/or data with one or more other components of the medical system 100 via the network 150. For example, the processing device 120 and/or the terminal device 140 may obtain an original image of a target blood vessel from the medical device 110 via the network 150. As another example, the processing device 120 and/or the terminal device 140 may obtain information stored in the storage device 130 via the network 150. The network 150 may be and/or include a public network (e.g., the Internet), a private network (e.g., a local area network (LAN), a wide area network (WAN), etc.), a wired network (e.g., an Ethernet network), a wireless network (e.g., a Wi-Fi network), a cellular network (e.g., a Long Term Evolution (LTE) network), a frame relay network, a virtual private network (VPN), a satellite network, a telephone network, routers, hubs, witches, server computers, and/or any combination thereof. For example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the medical system 100 may be connected to the network 150 to exchange data and/or information. In some embodiments, one or more components (e.g., the processing device 120) of the medical system 100 may communicate with the network 150 via a network adapter. The one or more components (e.g., the processing device 120) of the medical system 100 may communicate with the network adapter via a bus.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. In some embodiments, the medical system 100 may include one or more additional components and/or one or more components of the medical system 100 described above may be omitted. For example, the medical system 100 may include a cache memory, a data backup storage system, or the like. Additionally or alternatively, two or more components of the medical system 100 may be integrated into a single component. A component of the medical system 100 may be implemented on two or more sub-components.

Figure 2:
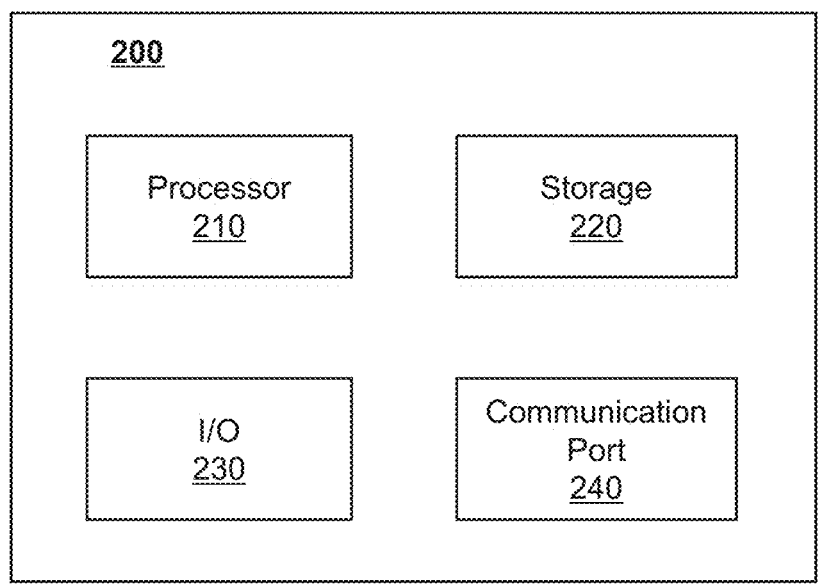
FIG. 2 is a schematic diagram illustrating exemplary hardware and/or software components of an exemplary computing device on which a processing device may be implemented according to some embodiments of the present disclosure.

FIG. 2 is a schematic diagram illustrating exemplary hardware and/or software components of an exemplary computing device on which the processing device 120 may be implemented according to some embodiments of the present disclosure. As illustrated in FIG. 2, a computing device 200 may include a processor 210, storage 220, an input/output (I/O) 230, and a communication port 240.

The processor 210 may execute computer instructions (e.g., program code) and perform functions of the processing device 120 in accordance with techniques described herein. The computer instructions may include, for example, routines, programs, objects, components, data structures, procedures, modules, and functions, which perform particular functions described herein. For example, the processor 210 may process image data obtained from the medical device 110, the terminal device 140, the storage device 130, and/or any other component of the medical system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combination thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage 220 may store data/information obtained from the medical device 110, the terminal device 140, the storage device 130, and/or any other component of the medical system 100. The storage 220 may be similar to the storage device 130 described in connection with FIG. 1, and the detailed descriptions are not repeated here.

The I/O 230 may input and/or output signals, data, information, etc. In some embodiments, the I/O 230 may enable a user interaction with the processing device 120. In some embodiments, the I/O 230 may include an input device and an output device. Examples of the input device may include a keyboard, a mouse, a touchscreen, a microphone, a sound recording device, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touchscreen, or the like, or a combination thereof.

The communication port 240 may be connected to a network (e.g., the network 150) to facilitate data communications. The communication port 240 may establish connections between the processing device 120 and the medical device 110, the terminal device 140, and/or the storage device 130. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or any combination thereof. In some embodiments, the communication port 240 may be and/or include a standardized communication port, such as RS232, RS485. In some embodiments, the communication port 240 may be a specially designed communication port. For example, the communication port 240 may be designed in accordance with the digital imaging and communications in medicine (DICOM) protocol.

Figure 3:
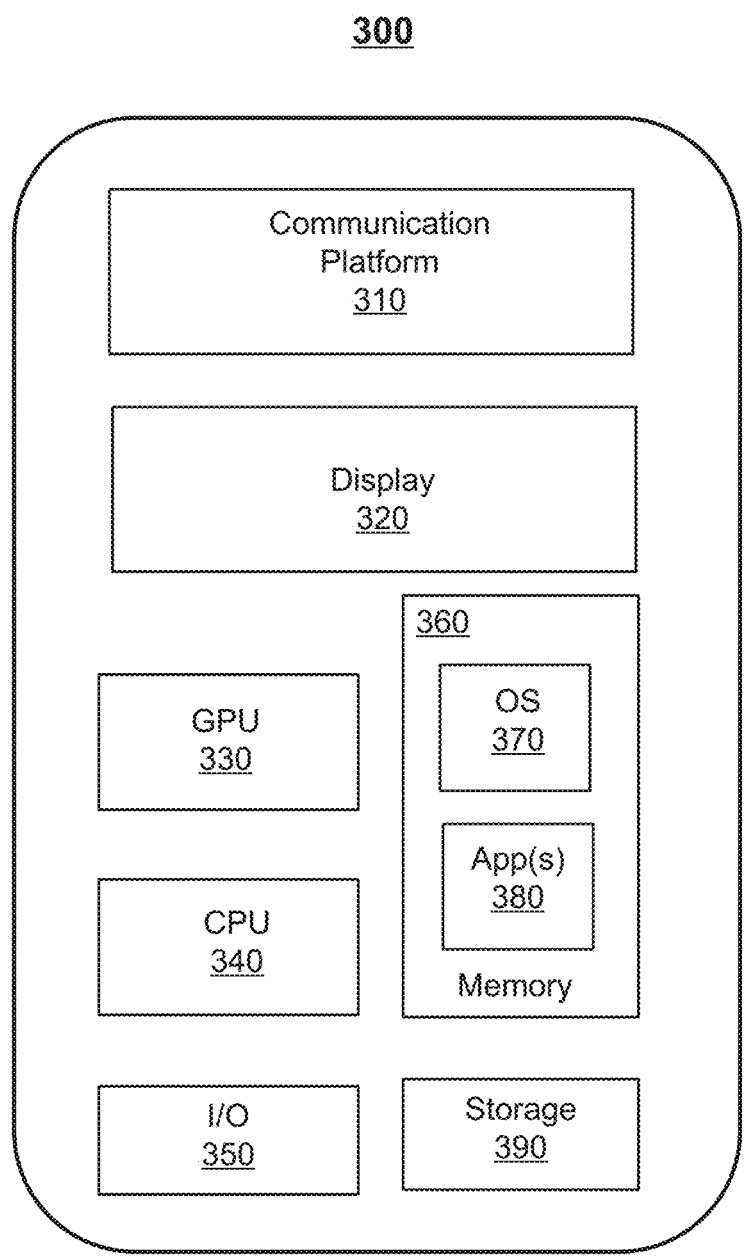
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the terminal device 140 and/or the processing device 120 may be implemented on a mobile device 300, respectively.

As illustrated in FIG. 3, the mobile device 300 may include a communication platform 310, a display 320, a graphics processing unit (GPU) 330, a central processing unit (CPU) 340, an I/O 350, a memory 360, and storage 390. In some embodiments, any other suitable component, including but not limited to a system bus or a controller (not shown), may also be included in the mobile device 300. The bus may include one or more types of bus structures (e.g., a memory bus, or a local bus used in a memory controller, a peripheral bus, a graphics acceleration port, or a processor). For example, the bus structures may include an industry standard architecture (ISA) bus, a microchannel architecture (MAC) bus, an enhanced ISA bus, a video electronics standards association (VESA) local bus, a peripheral component interconnection (PCI) bus, or the like.

In some embodiments, the communication platform 310 may be configured to establish a connection between the mobile device 300 and other components of the medical system 100, and enable data and/or signal to be transmitted between the mobile device 300 and other components of the medical system 100. For example, the communication platform 310 may establish a wireless connection between the mobile device 300 and the medical device 110, and/or the processing device 120. The wireless connection may include, for example, a Bluetooth™ link, a Wi-Fi™ link, a WiMax™ link, a WLAN link, a ZigBee link, a mobile network link (e.g., 3G, 4G, 5G), or the like, or any combination thereof. The communication platform 310 may also enable the data and/or signal between the mobile device 300 and other components of the medical system 100. For example, the communication platform 310 may transmit data and/or signals inputted by a user to other components of the medical system 100. The inputted data and/or signals may include a user instruction. As another example, the communication platform 310 may receive data and/or signals transmitted from the processing device 120. The received data and/or signals may include imaging data acquired by the medical device 110.

In some embodiments, a mobile operating system (OS) 370 (e.g., iOS™ Android™, Windows Phone™, etc.) and one or more applications (App(s)) 380 may be loaded into the memory 360 from the storage 390 in order to be executed by the CPU 340. The applications 380 may include a browser or any other suitable mobile apps for receiving and rendering information from the processing device 120. User interactions with the information stream may be achieved via the I/O 350 and provided to the processing device 120 and/or other components of the medical system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result the drawings should be self-explanatory.

Figure 4A:
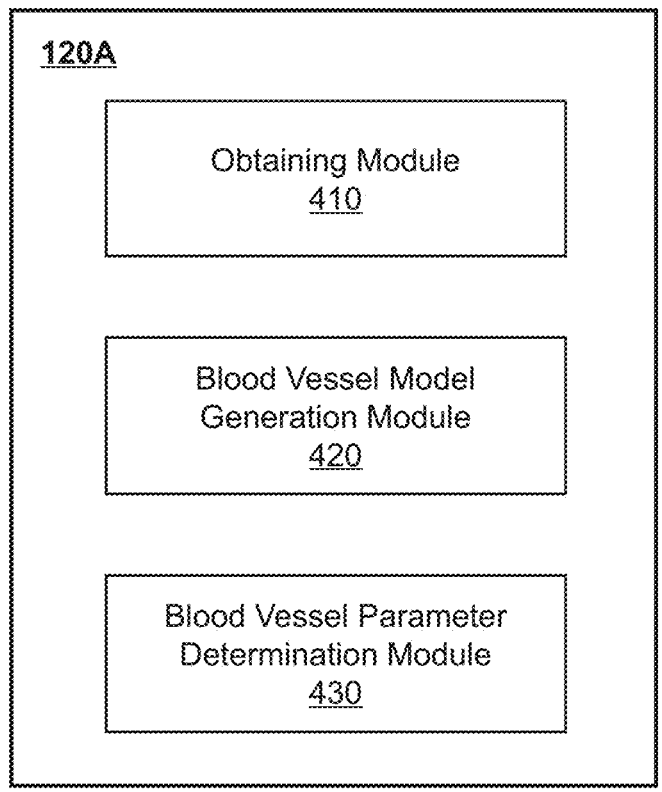
FIG. 4A is a block diagram illustrating an exemplary processing device 120A according to some embodiments of the present disclosure.
Figure 4B:
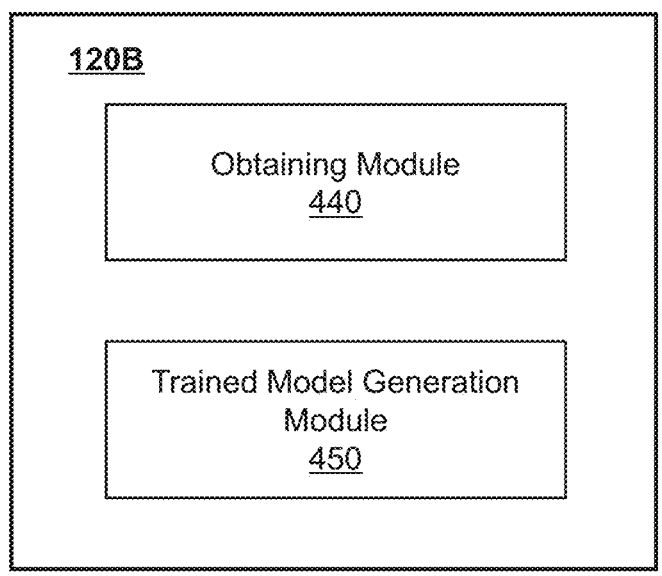
FIG. 4B is a block diagram illustrating an exemplary processing device 120B according to some embodiments of the present disclosure.

FIG. 4A is a block diagram illustrating an exemplary processing device 120A according to some embodiments of the present disclosure. FIG. 4B is a block diagram illustrating an exemplary processing device 120B according to some embodiments of the present disclosure. The processing device 120A may be configured to determine at least one blood vessel parameter of a target blood vessel based on a blood vessel model using a first trained model or a second trained model. In some embodiments, the processing device 120B may be configured to process information and/or data to generate a plurality of training samples (e.g., a plurality of groups of first training samples, a plurality of groups of second training samples). The processing device 120B may further be configured to generate a first trained model and/or a second trained model using the plurality of training samples.

In some embodiments, the processing devices 120A and 120B may be respectively implemented on a processing unit (e.g., a processor 210 illustrated in FIG. 2 or a CPU 340 as illustrated in FIG. 3). Merely by way of example, the processing devices 120A may be implemented on a computing device 200, and the processing device 120B may be implemented on a CPU 340 of a terminal device. Alternatively, the processing devices 120A and 120B may be implemented on a same computing device 200 or a same CPU 340. For example, the processing devices 120A and 120B may be implemented on a same computing device 200.

As shown in FIG. 4A, the processing device 120A may include an obtaining module 410, a blood vessel model generation module 420, and a blood vessel parameter determination module 430.

The obtaining module 410 may be configured to obtain data and/or information associated with the medical system 100. The data and/or information associated with the medical system 100 may include a blood vessel image, a blood vessel model, at least one blood flow parameter, at least one blood vessel parameter, or the like, or any combination thereof. For example, the obtaining module 410 may obtain a blood vessel image of a target blood vessel. As another example, the obtaining module 410 may obtain at least one blood flow parameter of a target blood vessel. In some embodiments, the obtaining module 410 may obtain the data and/or the information associated with the medical system 100 from one or more components (e.g., the medical device 110, the storage device 130, the terminal 140) of the medical system 100 via the network 150.

The blood vessel model generation module 420 may be configured to generate a blood vessel model of a target blood vessel. In some embodiments, the blood vessel model generation module 420 may generate a blood vessel model of a target blood vessel based on a blood vessel image. For example, the blood vessel model generation module 420 may determine at least one model parameter of a blood vessel model based on feature information of a target blood vessel. The blood vessel model generation module 420 may generate the blood vessel model by performing, based on the at least one model parameter, a grid division on a blood vessel image. More descriptions for the generation of the blood vessel model may be found elsewhere in the present disclosure (e.g., FIG. 5 and the descriptions thereof).

The blood vessel parameter determination module 430 may be configured to determine at least one blood vessel parameter of a target blood vessel based at least on a blood vessel model. For example, the blood vessel parameter determination module 430 may determine, based on a blood vessel model and at least one blood flow parameter, at least one blood vessel parameter of a target blood vessel using a first trained model. More descriptions for the determination of the at least one blood vessel parameter of the target blood vessel using a first trained model may be found elsewhere in the present disclosure (e.g., FIG. 6 and the descriptions thereof). As another example, the blood vessel parameter determination module 430 may determine a mathematical expression corresponding to a blood vessel model. The blood vessel parameter determination module 430 may then determine at least one blood vessel parameter of a target blood vessel using a second trained model based on the mathematical expression. More descriptions for the determination of the at least one blood vessel parameter of the target blood vessel using a second trained model may be found elsewhere in the present disclosure (e.g., FIG. 12 and the descriptions thereof).

As shown in FIG. 4B, the processing device 120B may include an obtaining module 440, and a trained model generation module 450.

The obtaining module 440 may be configured to obtain data and/or information associated with a first trained model and/or a second trained model. For example, the obtaining module 440 may obtain a plurality of groups of first training samples for training a first trained model. Each group of the plurality of groups of first training samples may include a preprocessed sample blood vessel model of a sample blood vessel and at least one reference blood vessel parameter of the sample blood vessel. More descriptions for the plurality of groups of first training samples may be found elsewhere in the present disclosure (e.g., FIG. 9 and the descriptions thereof). As another example, the obtaining module 440 may obtain a plurality of groups of second training samples for training a second trained model. Each group of the plurality of groups of second training samples may include a sample mathematical expression corresponding to a sample blood vessel model of a sample blood vessel and at least one reference blood vessel parameter of the sample blood vessel. More descriptions for the plurality of groups of second training samples may be found elsewhere in the present disclosure (e.g., FIG. 18 and the descriptions thereof).

The trained model generation module 450 may be configured to generate a trained model. For example, the trained model generation module 450 may generate a first trained model by training a first preliminary model using a plurality of groups of first training samples. More descriptions for the generation of the first trained model may be found elsewhere in the present disclosure (e.g., FIG. 9 and the descriptions thereof). As another example, the trained model generation module 450 may generate a second trained model by training a second preliminary model using a plurality of groups of second training samples. More descriptions for the generation of the second trained model may be found elsewhere in the present disclosure (e.g., FIG. 18 and the descriptions thereof).

It should be noted that the above description of the processing device 120A and the processing device 120B are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more modules may be added or omitted in the processing device 120A and/or the processing device 120B. For example, the processing device 120A may further include a storage module (not shown in FIG. 4A) configured to store data and/or information (e.g., an original image, a blood vessel image, a blood vessel model, a blood vessel parameter) associated with the medical system 100. As another example, the processing device 120A may further include a training module 440 (not shown in FIG. 4A) configured to generate a first trained model and/or a second trained model using a plurality of training samples. In some embodiments, two or more modules may be integrated into a single module. For example, the blood vessel model generation module 420 and the blood vessel parameter determination module 430 may be integrated into a single module.

Figure 5:
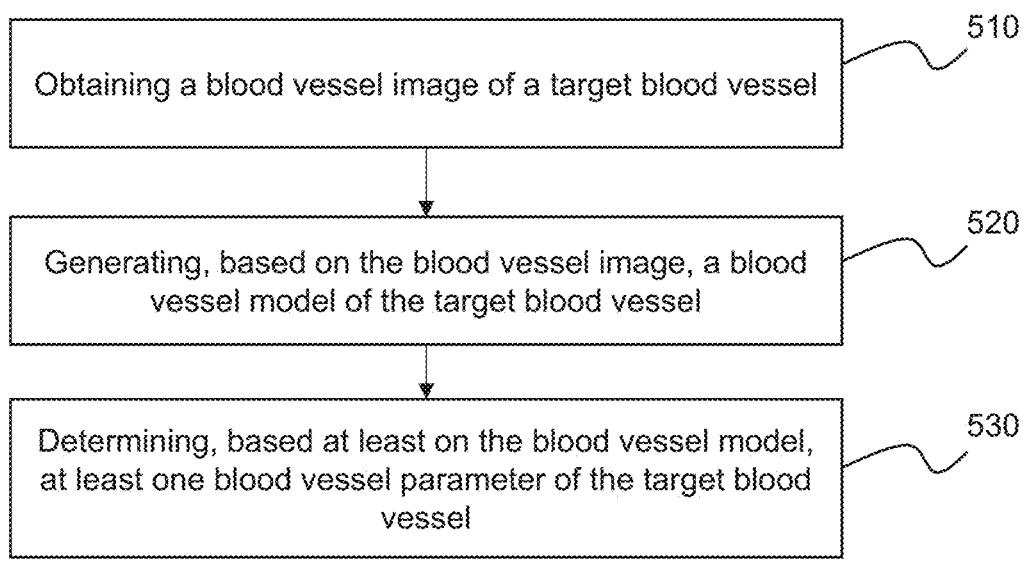
FIG. 5 is a flowchart illustrating an exemplary process for determining a blood vessel parameter of a target blood vessel according to some embodiments of the present disclosure.

FIG. 5 is a flowchart illustrating an exemplary process for determining a blood vessel parameter of a target blood vessel according to some embodiments of the present disclosure. In some embodiments, the process 500 may be implemented in the medical system 100 illustrated in FIG. 1. For example, the process 500 may be stored in the storage device 130 and/or the storage (e.g., the storage 220, the storage 390) as a form of instructions, and invoked and/or executed by the processing device 120A (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 510, the processing device 120A (e.g., the obtaining module 410) may obtain a blood vessel image of a target blood vessel.

As used herein, a target blood vessel refers to a blood vessel of interest or a part thereof. For example, the blood vessel may include an entire coronary artery, a branch of a coronary artery, an entrance cross-section of a coronary artery, or the like. In some embodiments, the target blood vessel may include one or more blood vessels of a same type or different types. For example, the target blood vessel may include an aortic vessel, a coronary artery, an abdominal artery, a brain artery, a lower extremity artery, a neck vessel, or the like, or any combination thereof. In some embodiments, the target blood vessel may be associated with a lesion that needs to be analyzed. For example, the target blood vessel may include a blood vessel associated with an aortic dissection, a hemangioma, or the like.

In some embodiments, the processing device 120A may obtain an original image of the target blood vessel. The original image of the target blood vessel refers to image data corresponding to the entire target blood vessel. In some embodiments, the original image of the target blood vessel may include a two-dimensional (2D) image, a three-dimensional (3D) image, a four-dimensional (4D) image (e.g., a series of 3D images over time), and/or any related image data. In some embodiments, the original image of the target blood vessel may include color image data, point-cloud data, depth image data, mesh data, scan data, projection data, or the like, or any combination thereof, of the target blood vessel.

In some embodiments, the original image of the target blood vessel may be captured by a medical device (e.g., the medical device 110). The original image of the target blood vessel may include a medical image. For example, the original image of the target blood vessel may include a CT image, an MRI image, a PET image, an ultrasound (US) image, an X-ray image, a DSA image, an MRA image, a CTA image, or the like. In some embodiments, the processing device 120A may obtain the original image of the target blood vessel from the medical device. Additionally or alternatively, the original image of the target blood vessel may be acquired by the medical device, and stored in a storage device (e.g., the storage device 130, the storage 220, the storage 390, or an external source). The processing device 120A may retrieve the original image of the target blood vessel from the storage device.

Further, the processing device 120A may determine a portion of the original image including the target blood vessel as the blood vessel image. For example, if the target blood vessel is a coronary artery, the processing device 120A may segment an image that includes the coronary artery from the original image to generate a blood vessel image of the coronary artery. In some embodiments, the blood vessel image may include a 2D image, a 3D image, or the like. For example, if the original image is a 3D image of the target blood vessel, and the blood vessel image may be a 3D image or a 2D image corresponding to the target blood vessel. As another example, if the original image is a 2D image, and the blood vessel image may be a 2D image corresponding to the target blood vessel.

In some embodiments, the blood vessel image may be automatically segmented from the original image by the processing device 120A according to an image analysis algorithm (e.g., an image segmentation algorithm). Exemplary image segmentation algorithm may include a segmentation algorithm based on genetic algorithms, an edge detection algorithm, a segmentation algorithm based on regions (e.g., a region growing segmentation algorithm, a thresholding segmentation algorithm, a clustering segmentation algorithm), a segmentation algorithm based on active contour model, a segmentation algorithm based on mathematical morphology, a segmentation algorithm based on statistics, a segmentation algorithm based on machine learning, or the like, or any combination thereof. Additionally or alternatively, the blood vessel image may be manually segmented from the original image by a user (e.g., a doctor, an imaging specialist, a technician) of the medical system 100. Additionally or alternatively, the blood vessel image may be segmented from the original image by the processing device 120A semi-automatically based on an image analysis algorithm in combination with information provided by a user. Exemplary information provided by the user may include a parameter relating to the image analysis algorithm, a position parameter relating to a region to be segmented, an adjustment to, rejection, or confirmation of a preliminary segmentation result generated by the processing device 120A, or the like.

In 520, the processing device 120A (e.g., the blood vessel model generation module 420) may generate, based on the blood vessel image, a blood vessel model of the target blood vessel.

Figure 14:
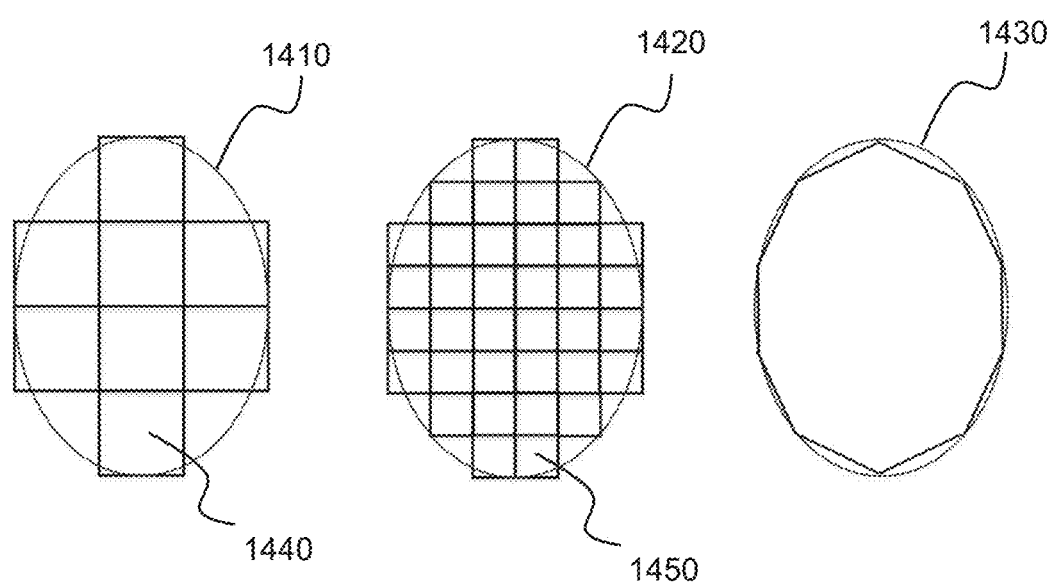
FIG. 14 is a schematic diagram illustrating different representations of a subject according to some embodiments of the present disclosure.

As used herein, a blood vessel model of a target blood vessel refers to a model of the target blood vessel representing the morphology of the target blood vessel. In some embodiments, the blood vessel model may include a 2D model (e.g., a 2D grid model), a 3D model (e.g., a 3D grid model), or the like. The 2D grid model or 3D grid model of the target blood vessel may include a plurality of grids (e.g., a plurality of grid nodes, edges, and faces) that define a 2D shape or a 3D shape of the target blood vessel. Compared to using a plurality of pixels or voxels to represent the morphology of the target blood vessel, the morphology of the target blood vessel may be represented more accurately using the plurality of grids. For example, as illustrated in FIG. 14, an ellipse 1410, an ellipse 1420, and an ellipse 1430 represent a same subject (e.g., a target blood vessel). The representation 1410 includes a plurality of pixels 1440 of a relatively large size. The representation 1420 includes a plurality of pixels 1450 of a relatively small size. The representation 1430 includes a plurality of grids. Compared to using a plurality of pixels to represent the shape of the subject, the shape of the subject may be represented more accurately using the plurality of grids, as shown in FIG. 14.

In some embodiments, the blood vessel model may include an unstructured grid model (e.g., an unstructured surface grid model, an unstructured volume grid model), a structured grid model (e.g., a structured surface grid model, a structured volume grid model), or the like, or any combination thereof. As used herein, an unstructured (or irregular) grid refers to a tessellation of a part of a Euclidean plane or a Euclidean space by shapes, such as triangles or tetrahedra, in an irregular pattern. As used herein, a structured (or regular) grid refers to a tessellation of a part of a Euclidean plane or a Euclidean space by shapes, such as quadrilaterals or cuboids, in a regular or periodical pattern. That is, the structured grid refers to that elements (e.g., grids) are well ordered, and a simple scheme repeats in a structured grid and can be used to label elements and identify neighbors. Merely by way of example, each grid in a 2D structured grid model may have four neighbor grids. In the unstructured grid, elements (e.g., grids) can be joined in any manner, and special lists may be determined to identify neighboring elements.

Figure 15:
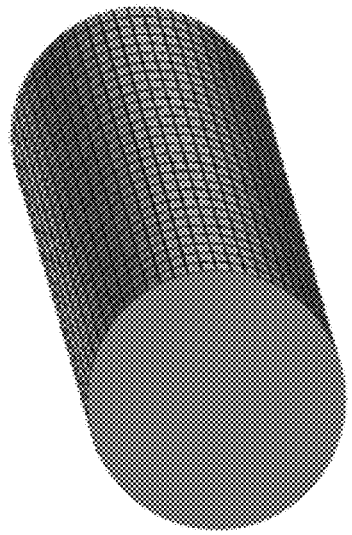
FIG. 15 is a schematic diagram illustrating an exemplary structured surface grid model and an exemplary structured volume grid model according to some embodiments of the present disclosure.
Figure 15:
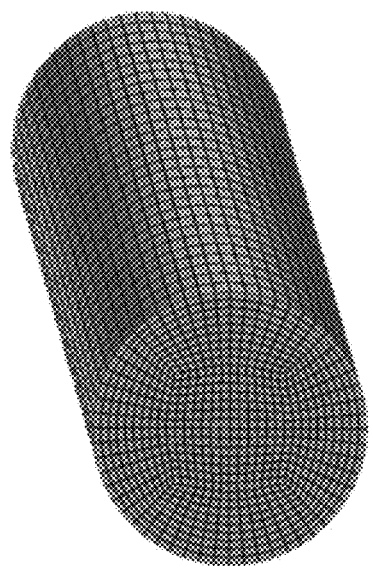
Figure 16:
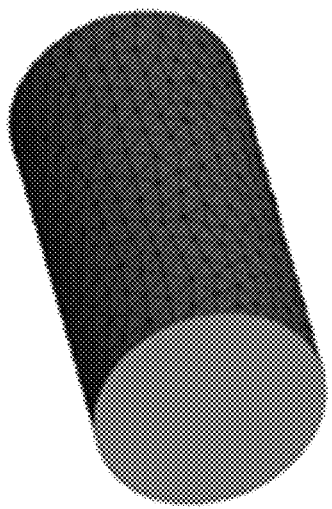
FIG. 16 is a schematic diagram illustrating an exemplary unstructured surface grid model and an exemplary unstructured volume grid model according to some embodiments of the present disclosure.
Figure 16:
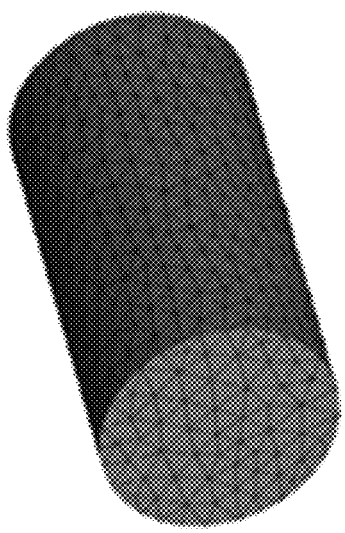

As used herein, a surface grid model refers to a model that only contains grids on the surface of the model. As used herein, a volume grid model refers to a model that contains grids on both the surface and the interior of the model. For example, in FIG. 15, 1510 illustrates a structured surface grid model, and 1520 illustrates structured volume grid model. As another example, in FIG. 16, 1610 illustrates an unstructured surface grid model, and 1620 illustrates an unstructured volume grid model.

In some embodiments, the processing device 120A may determine at least one model parameter of the blood vessel model based on feature information of the target blood vessel. The feature information of the target blood vessel may include a type of the target blood vessel, a diameter of the target blood vessel, a curvature of the target blood vessel, a direction of the target blood vessel, an exit area of the target blood vessel, an entrance area of the target blood vessel, or the like, or any combination thereof. As used herein, a curvature of a blood vessel refers to an angle between a line along a tangent direction of a specific point on a surface of the blood vessel and an arc length corresponding to the point, which can be used to describe a degree of deviation of a curve from a straight line. As used herein, a direction of a blood vessel refers to a direction of blood flow in the blood vessel. In some embodiments, the processing device 120A may determine the feature information (or a portion thereof) of the target blood vessel based on the original image and/or the blood vessel image of the target blood vessel according to an image analysis algorithm (e.g., an image segmentation algorithm, a feature extraction algorithm). Additionally or alternatively, the feature information (or a portion thereof) of the target blood vessel may be previously generated and stored in a storage device (e.g., the storage device 130, the storage 220, the storage 390, or an external source). The processing device 120A may retrieve the feature information (or a portion thereof) of the target blood vessel from the storage device.

In some embodiments, the at least one model parameter of the blood vessel model may include a grid density, a size of a grid, a shape of a grid, a grid count, or the like, or any combination thereof. As used herein, a grid density refers to a number (or count) of grids per unit area of a model. In some embodiments, the processing device 120A may determine at least one parameter value of the at least one model parameter based on the feature information of the target blood vessel and a relationship between feature information and at least one model parameter. For example, the relationship may be represented in the form of a table recording different feature information and their corresponding value(s) of the model parameter(s). The relationship between the feature information and the model parameter(s) may be stored in a storage device, and the processing device 120A may retrieve the relationship from the storage device. In some embodiments, the relationship between the feature information and the model parameter(s) may be determined by the processing device 120A based on experimental data or user experience.

In some embodiments, the processing device 120A may determine the grid density of the blood vessel model based on the type of the target blood vessel. The grid density of the blood vessel model corresponding to an aortic blood vessel may be smaller than the grid density of the blood vessel model corresponding to a coronary blood vessel. For illustration purposes, the target blood vessel may include an aortic blood vessel and a coronary blood vessel. The processing device 120A may divide a part of the blood vessel model corresponding to the aortic blood vessel using grids of one or more relatively large grid sizes. The processing device 120A may divide a part of the blood vessel model corresponding to the coronary blood vessel (especially a branch of the coronary blood vessel) using grids of one or more relatively small grid sizes. Accordingly, compared to a method of dividing blood vessel models corresponding to different types of blood vessels of a same grid density, the systems and methods disclosed herein in which the grid density of the blood vessel model are determined based on the type of the target blood vessel may better show the feature information of the target blood vessel, thereby improving the accuracy of the blood vessel parameter of the target blood vessel determined based thereon.

In some embodiments, the processing device 120A may determine the grid density of the blood vessel model based on the curvature of the target blood vessel. A relatively large curvature of the target blood vessel may correspond to a relatively small grid density of the blood vessel model of the target blood vessel. For example, the target blood vessel may include a plurality of blood vessel segments with different curvatures. The processing device 120A may divide a part of the blood vessel model corresponding to a blood vessel segment of a relatively large curvature using grids of one or more relatively small grid sizes that correspond to a relatively high grid density. The processing device 120A may divide a part of the blood vessel model corresponding to a blood vessel segment of a relatively small curvature using grids of one or more relatively large grid sizes that correspond to a relatively low grid density. Accordingly, compared to a method of dividing blood vessel models corresponding to blood vessel segments of different curvatures of a same grid density, the systems and methods disclosed herein in which the grid density of the blood vessel model are determined based on the curvature of the target blood vessel may better show the feature information of a specific position (e.g., a curved position) of the target blood vessel, thereby improving the accuracy of the blood vessel parameter of the target blood vessel determined based thereon.

In some embodiments, the processing device 120A may determine the grid density of the blood vessel model based on a combination of the type of the target blood vessel and the curvature of the target blood vessel. For example, the target blood vessel may include an aortic blood vessel and a coronary blood vessel. The aortic blood vessel may include a plurality of blood vessel segments of different curvatures. The processing device 120A may divide a part of the blood vessel model corresponding to a blood vessel segment of the aortic blood vessel of a relatively small curvature using grids of a first grid size, resulting in a first grid density in the part of the blood vessel model. The processing device 120A may divide a part of the blood vessel model corresponding to a blood vessel segment of the aortic blood vessel of a relatively large curvature using grids of a second grid size, resulting in a second grid density in the part of the blood vessel model. The processing device 120A may divide a part of the blood vessel model corresponding to the coronary blood vessel using grids of a third grid size, resulting in a third grid density in the part of the blood vessel model. At least two of the first grid size, the second grid size, and the third grid size may be different. At least two of the first grid density, the second grid density, and the third grid density may be different. For instance, the first grid size may be greater than the second grid size, and the second grid size may be greater than the third grid size; accordingly, the first grid density may be lower than the second grid density, and the second grid size may be lower than the third grid density.

Figure 7:
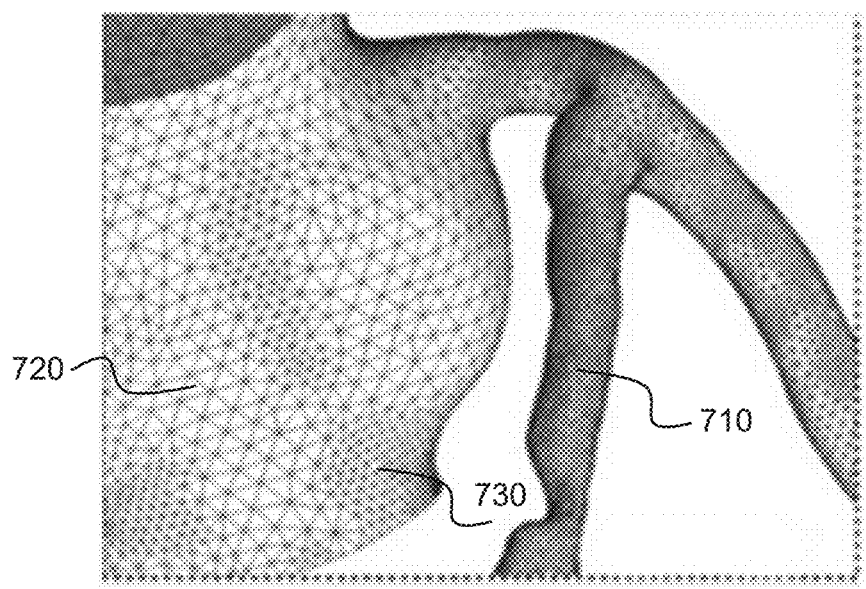
FIG. 7 is a schematic diagram illustrating an exemplary blood vessel model of a coronary artery according to some embodiments of the present disclosure.

FIG. 7 is a schematic diagram illustrating an exemplary blood vessel model of a coronary artery according to some embodiments of the present disclosure. As illustrated in FIG. 7, a blood vessel model 700 of a coronary artery of a patient may be divided into a plurality of grids. The blood vessel model 700 may be obtained by performing an image segmentation operation on a CTA image of the heart of the patient. The grid density of different regions of the blood vessel model 700 may be different. For example, compared to a region 720 or a region 730 corresponding to a main coronary artery, a region 710 corresponding to a branch of the coronary artery may be divided into a plurality of grids of a smaller grid size. Compared to the region 720 of a relatively small curvature, the region 730 of a relatively large curvature may be divided into a plurality of grids of a smaller grid size.

Further, the processing device 120A may generate the blood vessel model by performing a grid division on the blood vessel image based on the one or more model parameters. As used herein, a grid division refers to a process of generating grids or meshes on a model. The grid division may include a surface grid division, a volume grid division, or the like. The surface grid division may include dividing a surface of the model into 2-dimensional grids. That is, a surface grid model may be generated by performing the surface grid division on the model, e.g., a model 1510 shown in FIG. 15. Algorithms used in the grid division may include a triangular grid division, a quadrilateral grid division, a hexagonal grid division, or the like, or any combination thereof. Exemplary grid division algorithms may include a Loop algorithm, a butterfly subdivision algorithm, a Catmull-Clark algorithm, a Doo-Sabin algorithm, a Delaunay triangular division algorithm, an advancing front algorithm, an Octree algorithm, an Elliptic algorithm, a parametric model based algorithm, a trans-finite Interpolation (TFI) algorithm, a partial differential equations (PDE) algorithm, a C type, 0 type, H type (C.O.H.) grid generation algorithm, a transformation extension algorithm, a covering algorithm, or the like. The volume grid division may include dividing a model into 3-dimensional grids. The 3-dimensional grids may include a tetrahedral grid, a hexahedral grid, a prismatic grid (i.e., a boundary layer grid), a mixture grid of tetrahedron and hexahedron, a Cartesian grid, a ball filling grid, or the like. That is, a volume grid model may be generated by performing the volume grid division on the model, e.g., a model 1520 shown in FIG. 15.

Merely by way of example, the processing device 120A may generate the blood vessel model by performing a grid division on the blood vessel image based on the one or more model parameters according to a Delaunay triangular division algorithm. By applying the Delaunay triangular division algorithm, a plurality of acute triangle grids of the blood vessel model may be generated. For a 2D blood vessel model, none of the acute triangle grids may intersect with another acute triangle grid; two neighboring acute triangle grids may share no more than one common edge. For a 3D blood vessel model, none of the acute triangle grids may intersect with another acute triangle grid; two neighboring acute triangle grids may share no more than one common face. As used herein, two (2D or 3D) grids are considered neighboring grids if there are no other grid between the two grids.

In some embodiments, the processing device 120A may perform a grid division (e.g., a surface grid division) on a 2D blood vessel image based on the one or more model parameters, to generate a 2D blood vessel model. In some embodiments, the processing device 120A may perform a grid division (e.g., a surface grid division, a volume grid division) on a 3D blood vessel image based on the one or more model parameters, to generate a 3D blood vessel model.

Additionally or alternatively, the processing device 120A may generate an initial blood vessel model of the target blood vessel based on the blood vessel image. For example, the processing device 120A may identify a centerline of the target blood vessel in the blood vessel image according to one or more centerline determination algorithms. As used herein, a centerline of a blood vessel refers to an imaginary line located in the blood vessel. In some embodiments, the centerline may include a line of a set of one or more pixels (or voxels) in or near the center of the target blood vessel. Exemplary centerline determination algorithms may include a topological refinement algorithm, a tracking algorithm, a shortest path algorithm, a distance transformation algorithm, a similar region growth algorithm, or the like. The processing device 120A may then determine a contour of the target blood vessel based on the centerline of the target blood vessel. For example, the processing device 120A may determine a plurality of cross sections perpendicular to the centerline of the target blood vessel. For each cross section of the plurality of cross sections, the processing device 120A may determine a blood vessel region on the cross section based on the blood vessel image corresponding to the cross section and one or more cross sections adjacent to the cross section. The processing device 120A may determine the contour of the target blood vessel based on a boundary of the blood vessel region on the each cross section of the plurality of cross sections. The processing device 120A may further reconstruct the initial blood vessel model of the target blood vessel based on the centerline of the target blood vessel and the contour of the target blood vessel. For example, the processing device 120A may reconstruct the initial blood vessel model of the target blood vessel based on the centerline of the target blood vessel and the contour of the target blood vessel according to one or more reconstruction algorithms. Further, the processing device 120A may perform a grid division on the initial blood vessel model based on the one or more model parameters, to generate the blood vessel model. As another example, the processing device 120A may generate a contour map representing the blood vessel region based on a plurality of cross sections of the target blood vessel. The processing device 120A may reconstruct the blood vessel model of the target blood vessel based on the contour map according to one or more grid division algorithms (e.g., a restricted Delaunay triangulation algorithm, a marching cube algorithm). As still another example, the processing device 120A may determine a plurality of points on a contour of each of a plurality of cross sections of the target blood vessel. The processing device 120A may connect the plurality of points on the contours of the plurality of cross sections based on an order of the plurality of points on the each cross section and a relationship between points on adjacent cross sections. The processing device 120A may reconstruct the blood vessel model of the target blood vessel based on the plurality of connected points.

In 530, the processing device 120A (e.g., the blood vessel parameter determination module 430) may determine, based at least on the blood vessel model, at least one blood vessel parameter of the target blood vessel.

In some embodiments, a blood vessel parameter may reflect a physical state of a region or a point of the target blood vessel. For example, the blood vessel parameters may include a hemodynamic parameter at a specific region or a specific point of the target blood vessel (e.g., an exit position, an entrance position, a center point, a position of a relatively large curvature). The blood vessel parameters may include a blood pressure, a blood flow volume, a blood vessel wall shear stress, a blood vessel wall stress, a blood flow velocity, a blood flow direction, a blood flow resistance, a blood pressure differential between two positions of the target blood vessel, a center line of the target blood vessel, or the like, or any combination thereof. The blood vessel wall shear stress may be used to reflect a friction between a blood flow in the target blood vessel and a vascular endothelium.

In some embodiments, the processing device 120A may obtain at least one blood flow parameter of the target blood vessel. The processing device 120A may then determine the at least one blood vessel parameter of the target blood vessel using a first trained model based on the blood vessel model and the at least one blood flow parameter. For example, the processing device 120A may input the blood vessel model represented by a plurality of grids (and the at least one blood flow parameter) into the first trained model (e.g., a graph neural network model), and the first trained model may output the at least one blood vessel parameter corresponding to each grid node of a plurality of grid nodes (or each grid of a plurality of grids) of the blood vessel model. As used herein, a grid node of a blood vessel model refers to a point on the blood vessel model. A grid may encompass one or more grid nodes. For example, a grid with a square shape may include four grid nodes at the four corners of the grid and one or more grid nodes within the grid. The at least one blood vessel parameter corresponding to a grid node (or a grid) of the blood vessel model may indicate the at least one blood vessel parameter at a point (or a region) of the target blood vessel corresponding to the grid node or the grid on the blood vessel model. More descriptions for the determination of the at least one blood vessel parameter of the target blood vessel using a first trained model may be found elsewhere in the present disclosure (e.g., FIG. 6 and the descriptions thereof).

In some embodiments, the processing device 120A may determine a mathematical expression corresponding to the blood vessel model. The processing device 120A may then determine the at least one blood vessel parameter of the target blood vessel using a second trained model based on the mathematical expression. For example, the processing device 120A may input the mathematical expression corresponding to the blood vessel model into the second trained model, and the second trained model may output the at least one blood vessel parameter corresponding to each grid node of a plurality of grid nodes (or each grid of a plurality of grids) of the blood vessel model. More descriptions for the determination of the at least one blood vessel parameter of the target blood vessel using a second trained model may be found elsewhere in the present disclosure (e.g., FIG. 12 and the descriptions thereof).

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added in process 500. For example, process 500 may include an additional operation for transmitting the at least one blood vessel parameter to a terminal device (e.g., the terminal device 140) for display. As another example, process 500 may include an additional operation for transmitting the blood vessel model to a terminal device (e.g., the terminal device 140) for display. A user may modify a part or all of the blood vessel model. For example, the user may dilate, narrow, or smoothen the blood vessel model, or a portion thereof.

Figure 6:
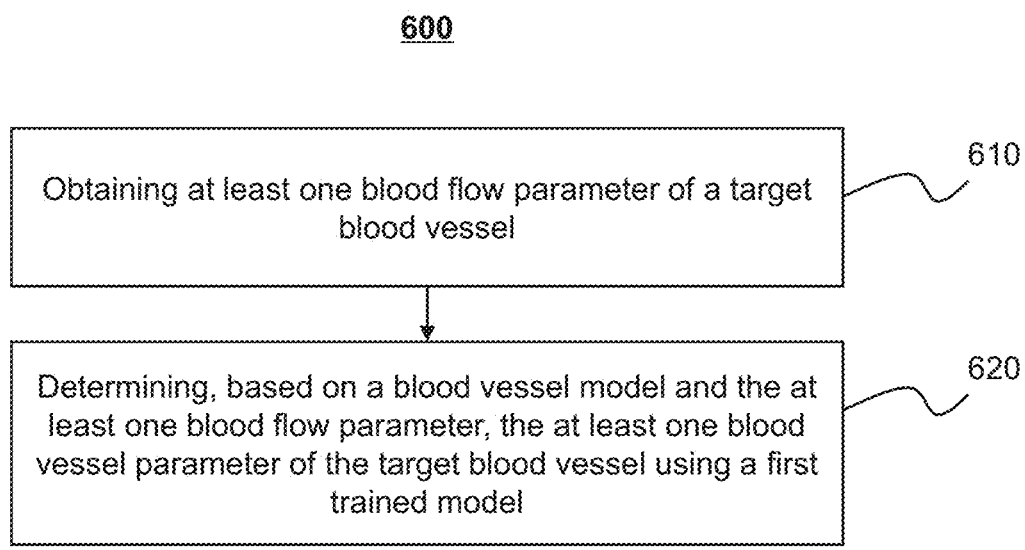
FIG. 6 is a flowchart illustrating an exemplary process for determining a blood vessel parameter of a target blood vessel according to some embodiments of the present disclosure.

FIG. 6 is a flowchart illustrating an exemplary process for determining a blood vessel parameter of a target blood vessel according to some embodiments of the present disclosure. In some embodiments, the process 600 may be implemented in the medical system 100 illustrated in FIG. 1. For example, the process 600 may be stored in the storage device 130 and/or the storage (e.g., the storage 220, the storage 390) as a form of instructions, and invoked and/or executed by the processing device 120A (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting. In some embodiments, at least part of operation 530 of process 500 may be performed according to the process 600.

In 610, the processing device 120A (e.g., the obtaining module 410) may obtain at least one blood flow parameter of a target blood vessel.

In some embodiments, the blood flow parameter of the target blood vessel may be used to set a boundary condition of a blood vessel model of the target blood vessel. As used herein, a boundary condition refers to a blood flow condition at a boundary of a blood vessel model of a blood vessel. The boundary may be an exit, an entrance, a vascular wall, or the like, of the blood vessel (e.g., the target blood vessel).

The blood flow parameter may include a blood density, a blood viscosity, a blood flow velocity (e.g., an average blood flow velocity), a blood flow volume (e.g., an average blood flow volume), a blood pressure, a cardiac output, or the like, or any combination thereof. The blood flow parameter may be determined by one or more components (e.g., the processing device 120A, a blood flow detection device) of the medical system 100, or manually set by a user of the medical system 100 according to different situations. In some embodiments, the blood flow parameter of the target blood vessel may be determined based on feature information of the target blood vessel and/or feature information of an organ or tissue that is connected to the target blood vessel. For example, the blood flow volume of a target blood vessel (e.g., a coronary artery entrance) may be estimated based on a cardiac output and/or a diameter of the target blood vessel. The cardiac output is obtained by analyzing volume changes of a heart chamber in a cardiac cycle. In some embodiments, the blood flow parameter of the target blood vessel may be determined based on empirical physiological data. For example, the blood flow volume of the target blood vessel (e.g., a coronary artery) may be proportional to the myocardial mass. The myocardial mass may be obtained by a noninvasive technique, such as by multiplying a myocardial volume to a myocardial density.

Additionally or alternatively, the blood flow parameter may be measured by a blood flow detection device. The processing device 120A may obtain the blood flow parameter from the blood flow detection device. For example, the blood pressure of the target blood vessel may be measured by a blood-pressure meter. As another example, the blood flow velocity of the target blood vessel may be measured by a blood flow meter.

In 620, the processing device 120A (e.g., the blood vessel parameter determination module 430) may determine, based on a blood vessel model and the at least one blood flow parameter, the at least one blood vessel parameter of the target blood vessel using a first trained model.

In some embodiments, the processing device 120A may preprocess the blood vessel model based at least on the at least one blood flow parameter to generate a preprocessed blood vessel model. For example, the processing device 120A may obtain at least one first grid node and at least one second grid node of the blood vessel model. In some embodiments, the first grid node may be a grid node with known blood flow parameters, and the second grid node may be a grid node with unknown blood flow parameters. For example, the first grid node (also referred to as a boundary grid node) of a blood vessel model may include a grid node on a boundary of the blood vessel model, and the second grid node (also referred to as a non-boundary grid node) may be a grid node on a non-boundary of the blood vessel model (e.g., a grid node inside the blood vessel model).

The processing device 120A may determine an initial value of the at least one first grid node based on the at least one blood flow parameter. For example, the processing device 120A may determine a value of a blood flow parameter measured at a specific position as an initial value of a first grid node corresponding to the specific position. The processing device 120A may then determine an initial value of the at least one second grid node based on a preset value. The preset value may be determined by one or more components (e.g., the processing device 120A) of the medical system 100, or manually set by a user of the medical system 100 according to different situations. For example, the preset value may be 0. The processing device 120A may further generate the preprocessed blood vessel model by preprocessing, based on the initial value of the at least one first grid node and the initial value of the at least one second grid node, the blood vessel model. For example, the processing device 120A may apply the initial value of the at least one first grid node and the initial value of the at least one second grid node to the blood vessel model.

Merely by way of example, the processing device 120A may generate a blood vessel model corresponding to a coronary artery of a patient. The processing device 120A may determine a blood pressure measured at a coronary artery entrance as an initial value of at least one first grid node corresponding to the coronary artery entrance of the blood vessel model. The processing device 120A may determine a blood flow volume at the coronary artery entrance as an initial value of the at least one first grid node corresponding to the coronary artery entrance of the blood vessel model. The processing device 120A may determine an initial value of at least one second grid node corresponding to at least one position other than the coronary artery entrance as 0. The processing device 120A may generate a preprocessed blood vessel model by applying the initial value of the at least one first grid node and the initial value of the at least one second grid node to the blood vessel model.

Further, the processing device 120A may determine the at least one blood vessel parameter of the target blood vessel based on the preprocessed blood vessel model using the first trained model. As used herein, a first trained model refers to a model (e.g., a machine learning model) or an algorithm for determining at least one blood vessel parameter of a target blood vessel based on a blood vessel model (or a preprocessed blood vessel model) of the target blood vessel. For example, the first trained model may be configured to generate the at least one blood vessel parameter of the target blood vessel based on the blood vessel model (or the preprocessed blood vessel model) of the target blood vessel. As another example, the first trained model may be configured to generate the at least one blood vessel parameter of the target blood vessel based on the blood vessel model (or the preprocessed blood vessel model) of the target blood vessel and at least one blood flow parameter of the target blood vessel.

In some embodiments, the first trained g model may be constructed based on a graph neural network (GNN) (e.g., a graph neural network). As used herein, a graph neural network model refers to a type of a neural network model that directly uses an image as an input; that is, the graph neural network model may directly process image data. Merely by way of example, the processing device 120A may generate a blood vessel model of a target blood vessel and/or preprocess the blood vessel model based on at least one blood vessel parameter of the target blood vessel to generate a preprocessed blood vessel model. The processing device 120A may input the preprocessed blood vessel model and the at least one blood flow parameter into the first trained model (e.g., a trained GNN model). The first trained model (e.g., the trained GNN model) may output at least one blood vessel parameter corresponding to a plurality of grid nodes of the preprocessed blood vessel model. The at least one blood vessel parameter corresponding to the plurality of grid nodes of the preprocessed blood vessel model may indicate the at least one blood vessel parameter at a plurality of points of the target blood vessel corresponding to the plurality of grid nodes of the preprocessed blood vessel model.

In some embodiments, the processing device 120A may retrieve the first trained model from the storage device 130, the terminal device 140, or any other storage device. For example, the first trained model may be obtained by training a first preliminary model using a processing device different from or same as the processing device 120A. The first trained model may be stored in the storage device 130, the terminal device 140, or any other storage device. The processing device 120A may retrieve the trained machine learning model from the storage device 130, the terminal device 140, or any other storage device. More descriptions of the determination of the first trained model may be found elsewhere in the present disclosure (e.g., FIGS. 9-11, and descriptions thereof).

According to some embodiments of the present disclosure, the at least one blood vessel parameter of the target blood vessel may be determined based on the blood vessel model of the target blood vessel and the at least one blood flow parameter of the target blood vessel using the first trained model. Compared with a blood vessel parameter determination approach that uses a computational fluid dynamics (CFD) algorithm to determine blood vessel parameters based on a blood vessel image, the systems and methods as disclosed herein may simplify the blood vessel parameters determination process by inputting the blood vessel model (and the at least one blood flow parameter) into the first trained model. Thus, the efficiency and/or accuracy of the blood vessel parameters determination may further be improved.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, an image format conversion operation may be added in process 600. For example, an image format of the preprocessed blood vessel model may be converted into an image format that meets an input condition of the first trained model. Merely by way of example, the preprocessed blood vessel model with an enhanced metafile (EMF) format may be converted into a joint photographic experts group (JPED) format that meets the input condition of the first trained model.

Figure 8:
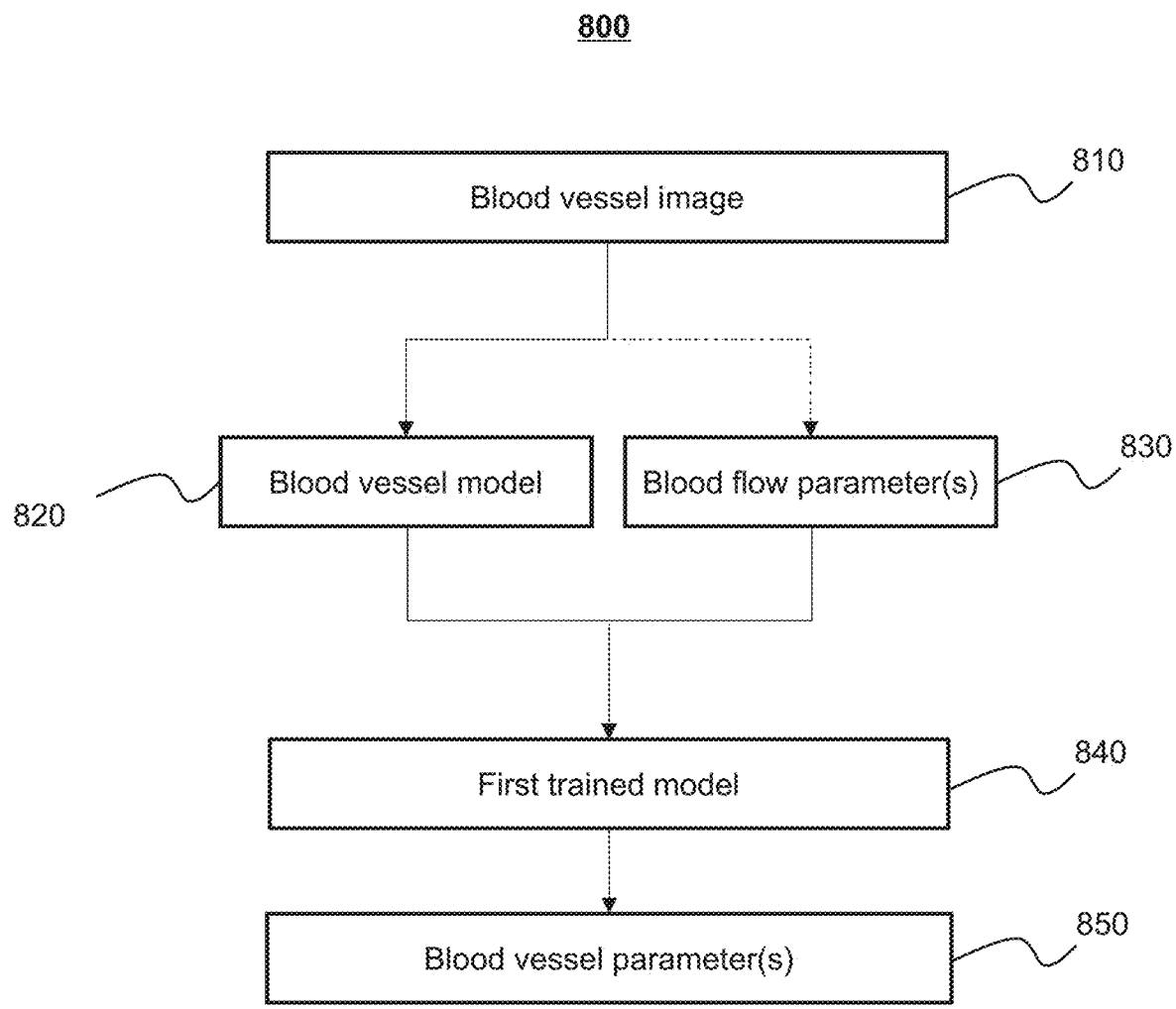
FIG. 8 is a schematic diagram illustrating an exemplary process for determining at least one blood vessel parameter of a target blood vessel according to some embodiments of the present disclosure.

FIG. 8 is a schematic diagram illustrating an exemplary process for determining at least one blood vessel parameter of a target blood vessel according to some embodiments of the present disclosure.

As illustrated in FIG. 8, in 810, the processing device 120A may obtain a blood vessel image of a target blood vessel as described in connection with operation 510. For example, the processing device 120A may determine a portion of an original image including the target blood vessel as the blood vessel image. In 820, the processing device 120A may generate a blood vessel model of the target blood vessel based on the blood vessel image as described in connection with operation 520. In 830, the processing device 120A may obtain at least one blood flow parameter of the target blood vessel as described in connection with operation 610. The at least one blood flow parameter of the target blood vessel may be determined based on the blood vessel image, or be measured by a blood flow detection device.

In 840, the processing device 120A may obtain a first trained model as described in connection with operation 620. In 850, the processing device 120A may determine the at least one blood vessel parameter of the target blood vessel based on the blood vessel model and the at least one blood flow parameter using the first trained model as described in connection with operation 620. For example, the processing device 120A may generate a preprocessed blood vessel model by preprocessing the blood vessel model based at least on the at least one blood flow parameter. The processing device 120A may then determine the at least one blood vessel parameter of the target blood vessel by inputting the preprocessed blood vessel model into the first trained model.

Figure 9:
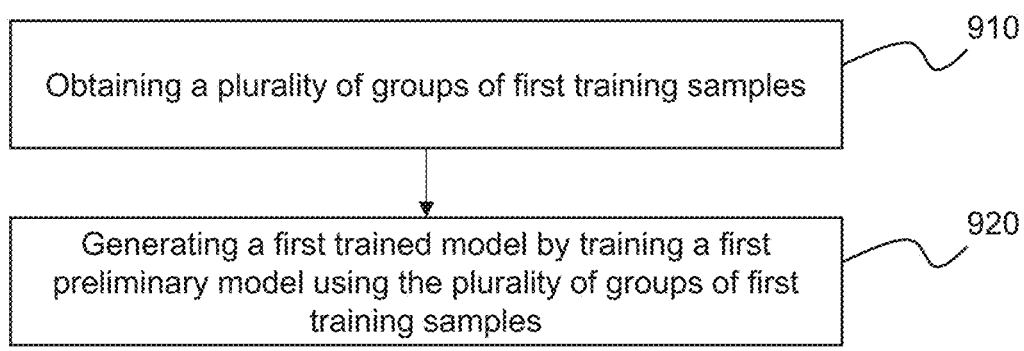
FIG. 9 is a flowchart illustrating an exemplary process for generating a first trained model according to some embodiments of the present disclosure.

FIG. 9 is a flowchart illustrating an exemplary process for generating a first trained model according to some embodiments of the present disclosure. In some embodiments, the process 900 may be implemented in the medical system 100 illustrated in FIG. 1. For example, the process 900 may be stored in the storage device 130 and/or the storage (e.g., the storage 220, the storage 390) as a form of instructions, and invoked and/or executed by the processing device 120B (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below is not intended to be limiting.

In 910, the processing device 120B (e.g., the obtaining module 440) may obtain a plurality of groups of first training samples.

In some embodiments, each group of the plurality of groups of first training samples may include a preprocessed sample blood vessel model of a sample blood vessel and at least one reference blood vessel parameter of the sample blood vessel. Each group of the plurality of groups of first training samples may include a sample blood vessel image of the sample blood vessel and a sample original image of the sample blood vessel. As used herein, a sample blood vessel refers to a blood vessel or a part thereof. The type of the sample blood vessel may be the same as or different from the type of the target blood vessel. For example, the sample blood vessel and the target blood vessel may both be an aortic vessel. As another example, the sample blood vessel may be a coronary artery, and the target blood vessel may be an aortic vessel.

In some embodiments, the processing device 120B may obtain a sample original image of the sample blood vessel. The sample original image of the sample blood vessel may be a historical image generated by scanning a subject, or a part of the subject, using a medical device (e.g., the medical device 110, another medical device). The processing device 120B may determine a portion of the sample original image including the sample blood vessel as the sample blood vessel image. The determination of the sample blood vessel image based on the sample original image may be performed in a similar manner as the determination of a blood vessel image based on an original image as described in connection with operation 510 in FIG. 5, the descriptions of which are not repeated here.

The processing device 120B may determine a sample blood vessel model of the sample blood vessel based on the sample blood vessel image. For example, the processing device 120B may determine at least one model parameter of the sample blood vessel model based on feature information of the sample blood vessel. The processing device 120B may generate the sample blood vessel model by performing, based on the at least one model parameter, a grid division on the sample blood vessel image. The generation of the sample blood vessel model based on the sample blood vessel image may be performed in a similar manner as the generation of a blood vessel model based on a blood vessel image as described in connection with operation 520 in FIG. 5, the descriptions of which are not repeated here.

The processing device 120B may obtain at least one sample blood flow parameter of the sample blood vessel. The sample blood flow parameter may include a sample blood density, a sample blood viscosity, a sample blood flow velocity, a sample blood flow volume, a sample blood pressure, a sample cardiac output, or the like, or any combination thereof. In some embodiments, the sample blood flow parameter may be determined by one or more components (e.g., the processing device 120B, a blood flow detection device) of the medical system 100, or manually set by a user of the medical system 100 according to different situations. In some embodiments, the sample blood flow parameter of the sample blood vessel may be determined based on feature information of the sample blood vessel and/or feature information of an organ or tissue that is connected to the sample blood vessel. Additionally or alternatively, the sample blood flow parameter may be measured by a blood flow detection device. The processing device 120B may obtain the sample blood flow parameter from the blood flow detection device. The obtaining of the at least one sample blood flow parameter of the sample blood vessel may be performed in a similar manner as the obtaining of at least one blood flow parameter of a target blood vessel as described in connection with operation 610 in FIG. 6, the descriptions of which are not repeated here.

The processing device 120B may generate the preprocessed sample blood vessel model by preprocessing, based on the at least one sample blood flow parameter, the sample blood vessel model. For example, the processing device 120B may obtain at least one first sample grid node and at least one second sample grid node of the sample blood vessel model. The processing device 120B may determine an initial value of the at least one first sample grid node based on the at least one sample blood flow parameter. The processing device 120B may determine an initial value of the at least one second sample grid node based on a preset value. The processing device 120B may generate a preprocessed sample blood vessel model by preprocessing, based on the initial value of the at least one first sample grid node and the initial value of the at least one second sample grid node, the sample blood vessel model. The generation of the preprocessed sample blood vessel model based on the sample blood vessel model may be performed in a similar manner as the generation of a preprocessed blood vessel model based on a blood vessel model as described in connection with operation 620 in FIG. 6, the descriptions of which are not repeated here.

In some embodiments, the processing device 120B may determine the at least one reference blood vessel parameter of the sample blood vessel based on the sample blood vessel model and the at least one sample blood flow parameter according to a first predetermined algorithm. For example, the at least one reference blood vessel parameter corresponding to each grid node of a plurality of grid nodes (or each grid of a plurality of grids) of the sample blood vessel model may be obtained based on the sample blood vessel model and the at least one sample blood flow parameter according to the first predetermined algorithm. In some embodiments, the reference blood vessel parameter may include a reference blood pressure, a reference blood flow volume, a reference blood vessel wall shear stress, a reference blood vessel wall stress, a reference blood flow velocity, a reference blood flow direction, a reference blood flow resistance, a reference center line of the sample blood vessel, or the like, or any combination thereof.

In some embodiments, the first predetermined algorithm may include a computational fluid dynamics (CFD) algorithm. As used herein, a CFD refers to an interdisciplinary method relating to mathematics, fluid mechanics, and computer science. The use of CFD may include simulating and analyzing fluid mechanics problems by solving control equations of fluid mechanics with computers and numerical methods. A control equation based on Euler equations, Navier-Stokes equations, or a Lattice Boltzmann method may be used in the determination of the at least one reference blood vessel parameter. A discretization technique such as a finite difference technique, a finite volume technique, a finite element technique, a boundary element technique, a spectral technique, a Lattice Boltzmann technique, a meshless technique, or the like, or any combination thereof, may be used in the determination of the at least one reference blood vessel parameter. A fluid of the flow field computation that used in the determination of the at least one reference blood vessel parameter may be viscous or non-viscous. The fluid may be compressible or incompressible. The fluid may be a laminar flow or a turbulent flow. The fluid may be a steady flow or an unsteady flow. A corresponding control equation or simulation method may be selected based on physical features of the simulated fluid. For example, the Euler equations or the Lattice Boltzmann method may be selected for the flow field computation of the non-viscous fluid, while the Navier-Stokes equations or the Lattice Boltzmann method may be selected for the flow field computation of the viscous fluid. For illustration purposes, a computation of the CFD for a coronary artery may use the Navier-Stokes equations.

In 920, the processing device 120B (e.g., the trained model generation module 450) may generate a first trained model by training a first preliminary model using the plurality of groups of first training samples.

As used herein, a preliminary model refers to a machine learning model to be trained. In some embodiments, the preliminary model may include an input layer an output layer, and a plurality of hidden layers. As used herein, a layer of a model may refer to an algorithm or a function for processing input data of the layer. Different layers may preform different kinds of processing on their respective input. For example, the input layer may be configured to receive an input of the preliminary model. Each hidden layer may perform a specific function, e.g., convolution, pooling, normalization, matrix multiplication, non-linear activation, or the like. The output layer may receive an input from the preceding layer and apply one or more transformations to the received input to generate a processing result of the preliminary model. In some embodiments, each of the layer may include one or more nodes. In some embodiments, each node may be connected to one or more nodes in a previous layer. The number of nodes in each layer may be the same or different. In some embodiments, each node may correspond to an activation function. As used herein, an activation function of a node may define an output of the node given an input or a set of inputs. In some embodiments, the processing device 120B may initialize one or more parameter values of one or more first parameters in the first preliminary model. Exemplary first parameters in the first preliminary model may include a size of a kernel of a layer, a total count (or number) of layers, a count (or number) of nodes in each layer, a learning rate, a batch size, an epoch, a connected weight between two connected nodes, a bias vector relating to a node, or the like. In some embodiments, the initial values of the first parameters may be default values determined by the medical system 100 or preset by a user of the medical system 100. In some embodiments, the processing device 120B may obtain the first preliminary model from a storage device (e.g., the storage device 130) of the medical system 100 and/or an external storage device via the network 150.

In some embodiments, the first trained model may be determined by training the first preliminary model using the plurality of groups of first training samples. One or more parameter values of the plurality of first parameters may be altered during the training of the first preliminary model using the plurality of groups of first training samples. In some embodiments, the first preliminary model may be trained based on the plurality of groups of first training samples using a training algorithm. Exemplary training algorithms may include a gradient descent algorithm, a Newton's algorithm, a Quasi-Newton algorithm, a Levenberg-Marquardt algorithm, a conjugate gradient algorithm, a generative adversarial learning algorithm, or the like.

In some embodiments, the first trained model may be determined by performing a plurality of iterations to iteratively update one or more parameter values of the plurality of first parameters of the first preliminary model. For each of the plurality of iterations, a specific group of first training samples may first be input into the first preliminary model. For example, a specific preprocessed sample blood vessel model in a specific group of first training samples may be inputted into an input layer of the first preliminary model, and a reference blood vessel parameter corresponding to the specific preprocessed sample blood vessel model may be inputted into an output layer of the first preliminary model as a desired output of the first preliminary model. The first preliminary model may extract one or more image features (e.g., a low-level feature (e.g., an edge feature, a texture feature), a high-level feature (e.g., a semantic feature), or a complicated feature (e.g., a deep hierarchical feature) included in the specific group of first training samples. Based on the extracted image features, the first preliminary model may determine a predicted output (i.e., a sample blood vessel parameter) of the specific group of first training samples. The predicted output (i.e., the sample blood vessel parameter) of the specific group of first training samples may then be compared with the reference blood vessel parameter of the specific group of first training samples based on a cost function. As used herein, a cost function of a machine learning model may be configured to assess a difference between a predicted output (e.g., a sample blood vessel parameter) of the machine learning model and a desired output (e.g., a reference blood vessel parameter). If the value of the cost function exceeds a threshold in a current iteration, parameter values of the first preliminary model may be adjusted and/or updated in order to decrease the value of the cost function (i.e., the difference between the sample blood vessel parameter and the reference blood vessel parameter) to smaller than the threshold, and an intermediate model may be generated. Accordingly, in the next iteration, another group of first training samples may be input into the intermediate model to train the intermediate model as described above.

The plurality of iterations may be performed to update the parameter values of the first preliminary model (or the intermediate model) until a termination condition is satisfied. The termination condition may provide an indication of whether the first preliminary model (or the intermediate model) is sufficiently trained. If the termination condition is satisfied in a current iteration, the processing device 120B may designate the first preliminary model (or the intermediate model) obtained in the current iteration as the first trained model. The termination condition may relate to the cost function or an iteration count of the iterative process or training process. For example, the termination condition may be satisfied if the value of the cost function associated with the first preliminary model (or the intermediate model) is minimal or smaller than a threshold (e.g., a constant). As another example, the termination condition may be satisfied if the value of the cost function converges. The convergence may be deemed to have occurred if the variation of the values of the cost function in two or more consecutive iterations is smaller than a threshold (e.g., a constant). As still another example, the termination condition may be satisfied when a specified number (or count) of iterations are performed in the training process.

It should be noted that, in response to a determination that the value of the cost function associated with the first preliminary model (or the intermediate model) is equal to the threshold (e.g., the constant), the processing device 120B may either determine that the termination condition is satisfied or determine that the termination condition is not satisfied.

It should be noted that the above description regarding the process 900 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, an image format conversion operation may be added in process 900. For example, an image format of the sample preprocessed blood vessel model may be converted into an image format that meets an input condition of the first preliminary model.

Figure 10:
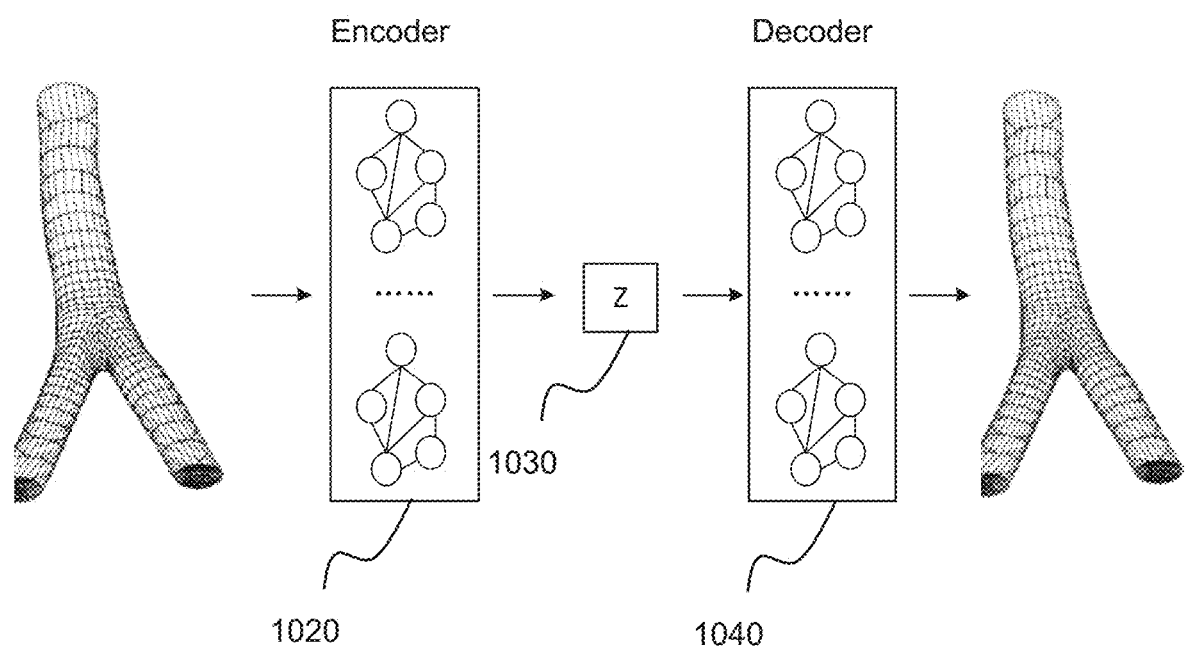
FIG. 10 is a schematic diagram illustrating an exemplary first trained model according to some embodiments of the present disclosure.

FIG. 10 is a schematic diagram illustrating an exemplary first trained model according to some embodiments of the present disclosure.

As illustrated in FIG. 10, a first trained model 1000 is a graph U-Net constructed based on a graph convolutional network. The first trained model 1000 includes an encoder 1020 and a decoder 1040. The encoder 1020 may be a graph convolutional network configured to determine a convolution of an input (e.g., a blood vessel model, a preprocessed blood vessel model) of the first trained model 1000, and encode the convolution to generate an encoding result 1030. The decoder 1040 may be a graph inverse convolutional neural network configured to decode the encoding result 1030, and generate an output (e.g., a blood vessel model including blood vessel parameters).

Figure 11:
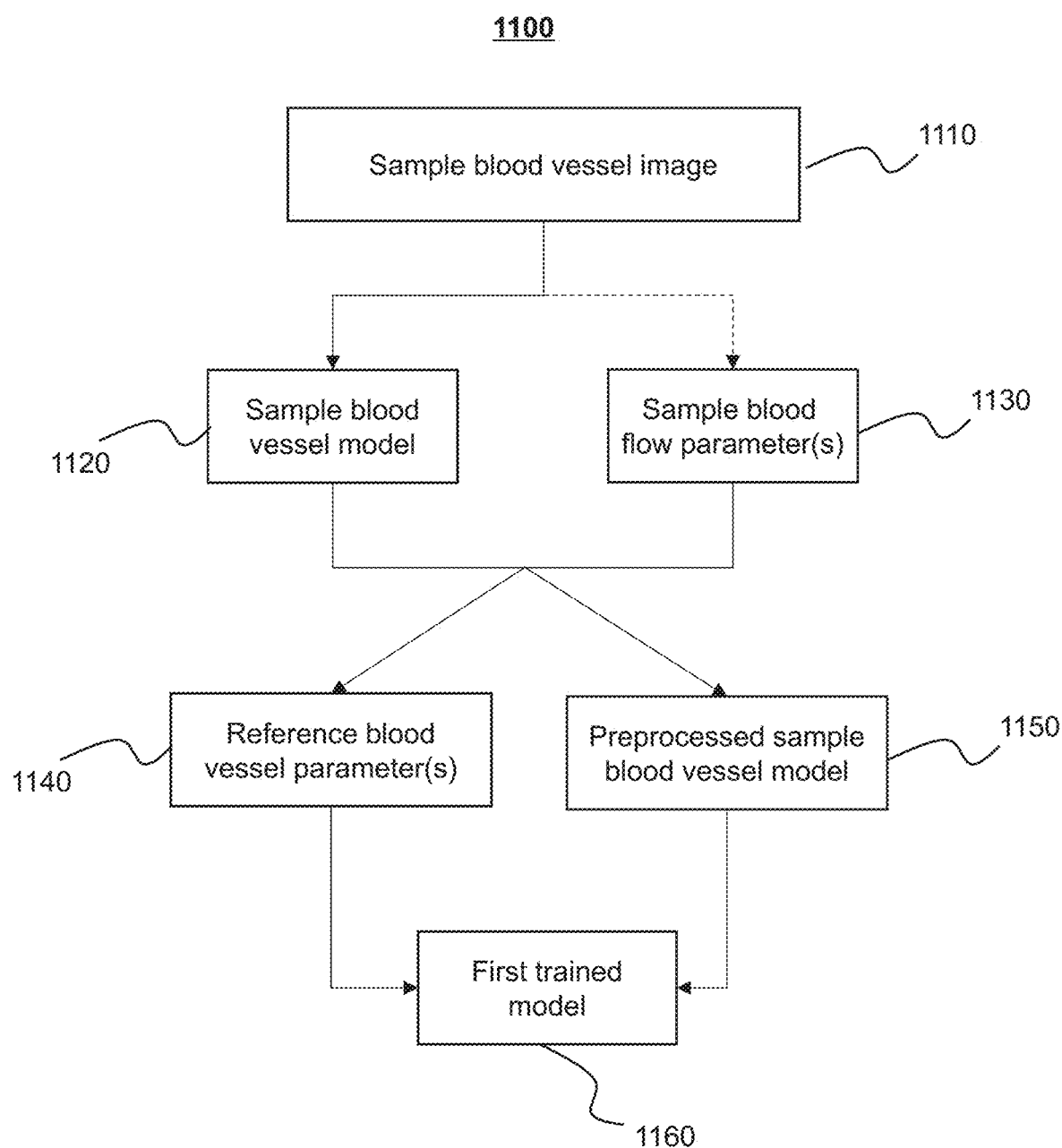
FIG. 11 is a schematic diagram illustrating an exemplary process for generating a first trained model according to some embodiments of the present disclosure.

FIG. 11 is a schematic diagram illustrating an exemplary process for generating a first trained model according to some embodiments of the present disclosure.

As illustrated in FIG. 11, in 1110, the processing device 120B may obtain a sample blood vessel image of a sample blood vessel as described in connection with operation 910. For example, the processing device 120B may determine a portion of a sample original image including the sample blood vessel as the sample blood vessel image. In 1120, the processing device 120B may determine a sample blood vessel model of the sample blood vessel based on the sample blood vessel image as described in connection with operation 910. For example, the processing device 120B may determine at least one model parameter of the sample blood vessel model based on feature information of the sample blood vessel. The processing device 120B may generate the sample blood vessel model by performing, based on the at least one model parameter, a grid division on the sample blood vessel image.

In 1130, the processing device 1206 may obtain at least one sample blood flow parameter of the sample blood vessel as described in connection with operation 910. The at least one sample blood flow parameter of the sample blood vessel may be determined based on the sample blood vessel image, or be measured by a blood flow detection device. In 1140, the processing device 120B may determine the at least one reference blood vessel parameter of the sample blood vessel based on the sample blood vessel model and the at least one sample blood flow parameter as described in connection with operation 910. For example, the processing device 120B may determine the at least one reference blood vessel parameter of the sample blood vessel based on the sample blood vessel model and the at least one sample blood flow parameter according to a computational fluid dynamics algorithm.

In 1150, the processing device 120B may generate a preprocessed sample blood vessel model by preprocessing the sample blood vessel model based on at least one sample blood flow parameter as described in connection with operation 910. In 1160, the processing device 120B may generate the first trained model by training a first preliminary model based on the preprocessed sample blood vessel model and the at least one reference blood vessel parameter of the sample blood vessel as described in connection with operation 920.

Figure 12:
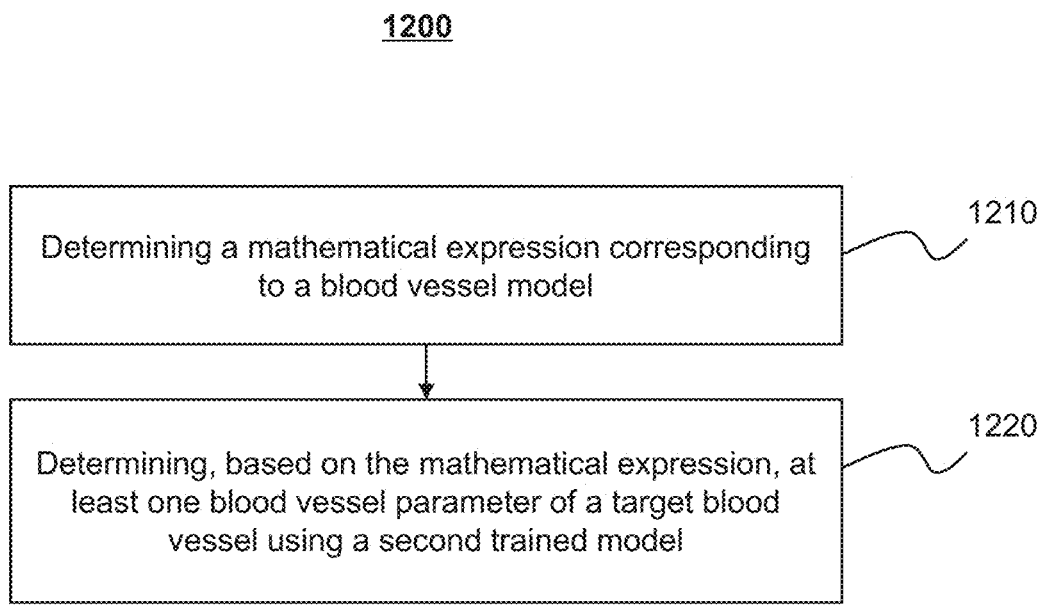
FIG. 12 is a flowchart illustrating an exemplary process for determining a blood vessel parameter of a target blood vessel according to some embodiments of the present disclosure.

FIG. 12 is a flowchart illustrating an exemplary process for determining a blood vessel parameter of a target blood vessel according to some embodiments of the present disclosure. In some embodiments, the process 1200 may be implemented in the medical system 100 illustrated in FIG. 1. For example, the process 1200 may be stored in the storage device 130 and/or the storage (e.g., the storage 220, the storage 390) as a form of instructions, and invoked and/or executed by the processing device 120A (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 1200 may be accomplished with one or more additional operations not described, and/or without one or more of the operations discussed. Additionally, the order in which the operations of the process 1200 as illustrated in FIG. 12 and described below is not intended to be limiting. In some embodiments, at least part of operation 530 of process 500 may be performed according to process 1200.

In 1210, the processing device 120A (e.g., the blood vessel parameter determination module 430) may determine a mathematical expression corresponding to a blood vessel model.

The mathematical expression corresponding to the blood vessel model may be used to describe properties or characteristics of a plurality of grids of the blood vessel model in numerically. The mathematical expression may include an array, a vector, a vector matrix, or the like, or any combination thereof.

In some embodiments, the processing device 120A may determine the mathematical expression corresponding to the blood vessel model by numerically processing the blood vessel model. For example, the processing device 120A may determine the mathematical expression corresponding to the blood vessel model based on coordinate information of a plurality of grids of the blood vessel model and the type of the blood vessel model.

In some embodiments, the blood vessel model may be a structured grid model (e.g., a structured surface grid model, a structured volume grid model), and the processing device 120A may divide the structured grid model into at least one first layer along an axial direction of the blood vessel model. Further, the processing device 120A may determine the mathematical expression based on first coordinate information of a plurality of first grids of the at least one first layer. More descriptions for determining a mathematical expression corresponding to a structured grid model may be found elsewhere in the present disclosure (e.g., FIG. 13, and the descriptions thereof).

In some embodiments, the blood vessel model may be an unstructured grid model, and the processing device 120A may map the unstructured grid model to a structured grid model. For example, the processing device 120A may determine a key element group and a local direction group corresponding to each grid of a plurality of grids in an unstructured grid model. The key element group corresponding to a grid may include a plurality of edges and at least one vertex that can determine a local direction of the grid. Merely by way of example, a key element group of a triangular grid may include three edges and one vertex. In some embodiments, the processing device 120A may determine a key element and a local direction corresponding to the each grid of the plurality of grids based on the key element group and the local direction group corresponding to the grid using, e.g., a maximized Jacobian matrix and determinant or a front propulsion technology. The processing device 120A may transform the unstructured grid model to a structured grid model based on the key element and the local direction corresponding to the each grid. The processing device 120A may then determine a mathematical expression corresponding to the structured grid model. For example, the processing device 120A may divide the structured grid model into at least one second layer along an axial direction of the structured grid model. The processing device 120A may determine the mathematical expression based on second coordinate information of a plurality of second grids of the at least one second layer. The processing device 120A may further designate the mathematical expression corresponding to the structured grid model as the mathematical expression corresponding to the unstructured grid model. Additionally or alternatively, the processing device 120A may determine the mathematical expression based on third coordinate information of a plurality of third grids of the unstructured grid model.

In 1220, the processing device 120A (e.g., the blood vessel parameter determination module 430) may determine, based on the mathematical expression, at least one blood vessel parameter of a target blood vessel using a second trained model.

As used herein, a second trained model refers to a model (e.g., a machine learning model) or an algorithm for determining at least one blood vessel parameter of a target blood vessel based on a mathematical expression corresponding to a blood vessel model of the target blood vessel. In some embodiments, the second trained model may be constructed based on a neural network model, such as a deep neural network (DNN) model, a convolutional neural network model (CNN) model, a recurrent neural network (RNN) model, a feature pyramid network (FPN) model, a fully convolutional neural network (FCN) model, a generative adversarial network (GAN) model, or the like, or any combination thereof. For example, the processing device 120A may input the mathematical expression corresponding to a blood vessel model of the target blood vessel into the second trained model. The second trained model may output the at least one blood vessel parameter of the target blood vessel. As another example, the processing device 120A may obtain at least one blood flow parameter of the target blood vessel, and input the mathematical expression and the at least one blood flow parameter into the second trained model. The second trained model may output the at least one blood vessel parameter of the target blood vessel.

In some embodiments, the processing device 120A may retrieve the second trained model from the storage device 130, the terminal device 140, or any other storage device. For example, the second trained model may be obtained by training a second preliminary model using a processing device different from or the same as the processing device 120A. The second trained model may be stored in the storage device 130, the terminal device 140, or any other storage device. The processing device 120A may retrieve the second trained model from the storage device 130, the terminal device 140, or any other storage device. More descriptions of the determination of the second trained model may be found elsewhere in the present disclosure (e.g., FIGS. 18-19, and the descriptions thereof).

According to some embodiments of the present disclosure, the at least one blood vessel parameter of the target blood vessel may be determined based on the mathematical expression corresponding to the blood vessel model of the target blood vessel and the at least one blood flow parameter of the target blood vessel using the second trained model. Compared with an approach which only uses the mathematical expression corresponding to the blood vessel model of the target blood vessel to determine blood vessel parameters, the systems and methods disclosed herein may improve the accuracy of the blood vessel parameters determination by using both the mathematical expression corresponding to the blood vessel model of the target blood vessel and the at least one blood flow parameter of the target blood vessel. In addition, compared with a blood vessel parameter determination approach that uses a computational fluid dynamics (CFD) algorithm to determine blood vessel parameters based on a blood vessel image, the systems and methods for as disclosed herein may simplify the blood vessel parameters determination process by inputting the mathematical expression corresponding to the blood vessel model of the target blood vessel (and the at least one blood flow parameter of the target blood vessel) into the second trained model. Thus, the efficiency and/or accuracy of the blood vessel parameters determination may further be improved.

Furthermore, a surface grid model of the target blood vessel may be generated based on the blood vessel image of the target blood vessel. Compared with a volume grid model, the surface grid model may use fewer grids to represent the geometry of target blood vessel, and the mathematical expression of the surface grid model may be simpler than that of the volume grid model. When the mathematical expression of the surface grid model is determined as an input of the second trained model, the number (or count) of parameters used for training of the second trained model may be reduced, which may improve the training efficiency of the second trained model and reduce the memory occupied.

It should be noted that the above description regarding the process 1200 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 13:
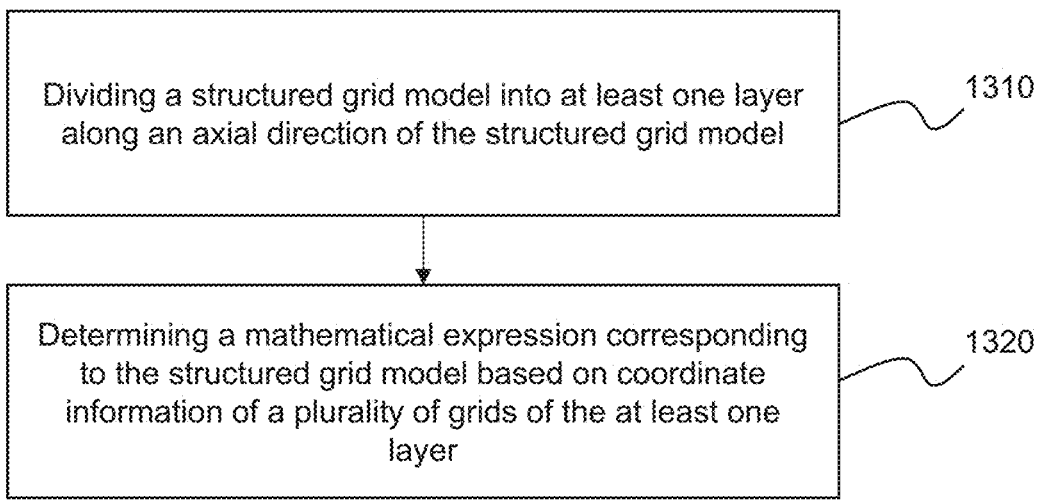
FIG. 13 is a flowchart illustrating an exemplary process for determining a mathematical expression corresponding to a structured grid model according to some embodiments of the present disclosure.

FIG. 13 is a flowchart illustrating an exemplary process for determining a mathematical expression corresponding to a structured grid model according to some embodiments of the present disclosure. In some embodiments, the process 1300 may be implemented in the medical system 100 illustrated in FIG. 1. For example, the process 1300 may be stored in the storage device 130 and/or the storage (e.g., the storage 220, the storage 390) as a form of instructions, and invoked and/or executed by the processing device 120A (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 1300 may be accomplished with one or more additional operations not described, and/or without one or more of the operations discussed. Additionally, the order in which the operations of the process 1300 as illustrated in FIG. 13 and described below is not intended to be limiting. In some embodiments, at least part of operation 1210 of process 1200 may be performed according to process 1300.

In 1310, the processing device 120A (e.g., the blood vessel parameter determination module 430) may divide a structured grid model into at least one layer along an axial direction of the structured grid model.

As used herein, an axial direction of a blood vessel model refers to a direction parallel to a center line of the blood vessel model. For example, the axial direction may be a direction along the center line of the blood vessel model. The layer may be a cross-section of the blood vessel model perpendicular to the axial direction of the blood vessel model. Each layer of the at least one layer may include a plurality of grids. For example, if the blood vessel model is a structured surface grid model, the layer may include a plurality of grids on a contour of the layer. As another example, if the blood vessel model is a structured volume grid model, the layer may include a plurality of grids on a contour and an interior of the layer. See, e.g., FIGS. 17A and 17B, and the descriptions thereof.

In some embodiments, a position of a grid in the blood vessel model may be represented by coordinates (e.g., 3D floating point coordinates) in a model coordinate system. As used herein, coordinates of a grid in a model coordinate system refers to coordinates of a specific point (e.g., a center point) in the grid in the model coordinate system. In some embodiments, different model coordinate systems may be constructed for different blood vessel models. For example, for the model coordinate system of the blood vessel model in some embodiments of the present disclosure, an origin may be a center point of the blood vessel model. The X-axis (e.g., the X-axis illustrated in FIG. 17A) may be from a left side to a right side of the blood vessel model viewed from the direction of the blood flow within the blood vessel represented by the blood vessel model. The Y-axis (e.g., the Y-axis illustrated in FIG. 17A) may be along the direction of the blood flow within the blood vessel represented by the blood vessel model. The Z-axis (e.g., the Z-axis illustrated in FIG. 17A) direction may be perpendicular to the plane defined by the X-axis and the Y-axis.

In 1320, the processing device 120A (e.g., the blood vessel parameter determination module 430) may determine a mathematical expression corresponding to the structured grid model based on coordinate information of a plurality of grids of the at least one layer.

In some embodiments, the blood vessel model may be a structured surface grid model, and each layer of the at least one layer of the structured surface grid model may include a plurality of grids on a contour of the layer. For example, if the cross-section of the blood vessel model is circular, the plurality of grids may form a ring centered on a location of a center of the layer. For each of the at least one layer, the processing device 120A may determine a layer vector corresponding to the layer based on the coordinate information of the plurality of grids of the layer. In some embodiments, the plurality of grids of the layer may be arranged in a row or a column. For example, a specific grid (e.g., an arbitrary grid) of the layer may be designated as a first grid of a row of grids, a grid next to the first grid in a clockwise direction (or a counterclockwise direction) may be designated as a second grid of the row of grids, a grid next to the second grid in the clockwise direction (or the counterclockwise direction) may be designated as a third grid of the row of grids, and so on. The processing device 120A may then determine the layer vector corresponding to the layer based on the coordinate information of the row of grids or the column of grids. Further, the processing device 120A may determine a vector matrix (e.g., a 2D row vector matrix, a 2D column vector matrix) corresponding to the blood vessel model based on at least one layer vector corresponding to the at least one layer. For example, each layer vector may be designated as a row vector or a column vector of the vector matrix.

Figure 17A:
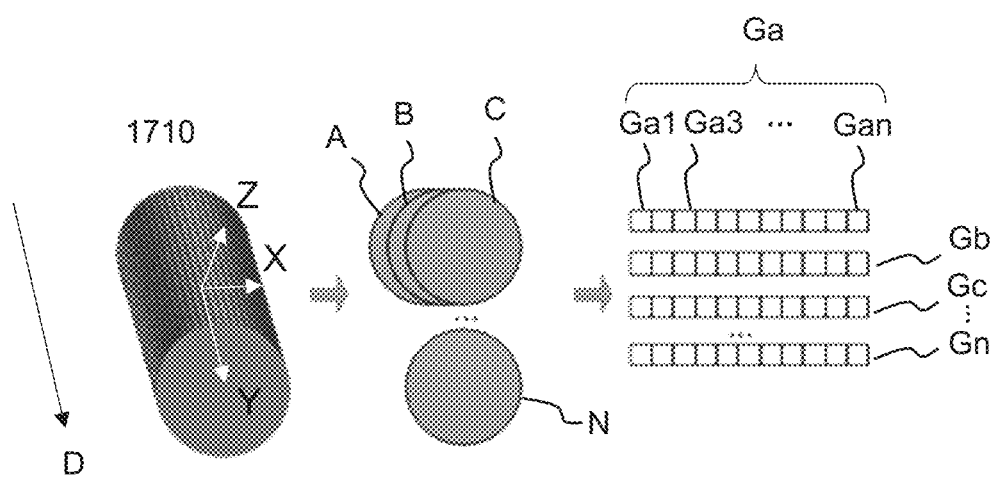
FIG. 17A is a schematic diagram illustrating an exemplary process for determining a mathematical expression corresponding to a structured surface grid model according to some embodiments of the present disclosure.

FIG. 17A is a schematic diagram illustrating an exemplary process for determining a mathematical expression corresponding to a structured surface grid model according to some embodiments of the present disclosure. As illustrated in FIG. 17A, the processing device 120A may divide a structured surface grid model 1710 into a plurality of layers, e.g., a first layer A, a second layer B, a third layer C, . . . , and a nth layer N, along an axial direction D of the structured surface grid model 1710. Each layer of the plurality of layers may include a plurality of grids. For example, the first layer A may include a plurality of first grids Ga, the second layer B may include a plurality of second grids Gb, the third layer C may include a plurality of third grids Gc, . . . , and the nth layer may include a plurality of nth grids Gn. The plurality of grids of the each layer may be arranged in a row. For example, a specific first grid (e.g., an arbitrary first grid) of the first layer A may be designated as a first grid Ga1, a first grid next to the first grid Ga1 in a clockwise direction (or a counterclockwise direction) may be designated as a first grid Ga2, a first grid next to the first grid Ga2 in the clockwise direction (or the counterclockwise direction) may be designated as a first grid Ga3, and so on.

The processing device 120A may determine a first layer vector Va corresponding to the first layer A based on coordinate information of the plurality of first grids Ga of the first layer A. Merely by way of example, if coordinates of the first grid Ga1 are (X1, Y1, Z1), coordinates of the first grid Ga2 are (X2, Y2, Z2), coordinates of the first grid Ga3 are (X3, Y3, Z3), . . . , and coordinates of a first grid Gan are (Xn, Yn, Zn), the processing device 120A may determine that the first layer vector Va corresponding to the first layer A is ((X1, Y1, Z1), (X2, Y2, Z2), (X3, Y3, Z3), . . . , (Xn, Yn, Zn)). Similarly, the processing device 120A may determine a second layer vector Vb corresponding to the second layer B based on coordinate information of the plurality of second grids Gb of the second layer B. The processing device 120A may determine a third layer vector Vc corresponding to the third layer C based on coordinate information of the plurality of third grids Gc of the third layer C. The processing device 120A may determine a nth layer vector Vn corresponding to the nth layer N based on coordinate information of the plurality of nth grids Gn of the nth layer N. Further, the processing device 120A may determine a vector matrix corresponding to the structured surface grid model 1710 based on the first layer vector Va, the second layer vector Vb, the third layer vector Vc, . . . , and the nth layer vector Vn. For example, the processing device 120A may determine that the vector matrix corresponding to the structured surface grid model 1710 is (Va, Vb, Vc, . . . , Vn).

In some embodiments, the blood vessel model may be a structured volume grid model, and each layer of the at least one layer of the structured volume grid model may include a plurality of grids on a contour and an interior of the layer. The plurality of grids may form a plurality of rings from a center of the layer and outward. In some embodiments, the plurality of rings of grids may be arranged in a plurality of rows of grids (or a plurality of columns of grids). Each of the plurality of rings may correspond to each of the plurality of rows (or each of the plurality of columns). For example, the rows from top to bottom may correspond to the rings from the center outward in the layer, respectively. For each row of the plurality of rows in each layer, the processing device 120A may determine a row vector corresponding to the row based on the coordinate information of the plurality of grids of the row. For each layer of the at least one layer, the processing device 120A may determine a layer vector matrix (e.g., a 2D layer vector matrix) corresponding to the layer based on a plurality of row vectors corresponding to the plurality of rows in the layer. Further, the processing device 120A may determine a vector matrix (e.g., a 3D vector matrix) corresponding to the blood vessel model based on at least one layer vector matrix corresponding to the at least one layer.

In some embodiments, for a structured volume grid model, the processing device 120A may determine whether a count of elements in each row vector in each layer is the same. An element corresponds to a grid. In response to determining that a count of elements in a row vector in a specific layer is different from other row vectors in the specific layer, the processing device 120A may complement the row vector by adding elements such that the count of elements in the each row vector in each layer is the same. For example, the processing device 120A may complement a specific row vector by adding elements based on a grid relationship between the specific row and a row adjacent to the specific row of the layer. Accordingly, the count of elements in the each row vector in the each layer may be the same, and a vector matrix may be determined based on the plurality of row vectors, which may facilitate to perform a convolution operation on the vector matrix.

Merely by way of example, in a structured volume grid model, a specific layer may include a first row of grids, a second row of grids, and a third row of grids. The first row of grids may include a grid A1, a grid A2, and a grid A3. The second row of grids may include a grid B1 and a grid B2. The grid B1 is adjacent to the grid A1 and the grid A2, and the grid B2 is adjacent to the grid A2 and the grid A3. The third row of grids may include a grid C1. The grid C1 is adjacent to the grid B1 and the grid B2. A first row vector corresponding to the first row may be determined based on coordinate information of the grid A1, the grid A2, and the grid A3. The first element in the first row vector may be coordinates of the grid A1, the second element in the first row vector may be coordinates of the grid A2, and the third element in the first row vector may be coordinates of the grid A3. That is, the count of elements in the first row vector may be three. A second row vector corresponding to the second row may be determined based on coordinate information of the grid B1 and the grid B2. The first element in the second row vector may be coordinates of the grid B1, and the second element in the second row vector may be coordinates of the grid B2. That is, the count of elements in the second row vector may be two. A third row vector corresponding to the third row may be determined based on coordinate information of the grid C1. The element in the third row vector may be coordinates of the grid C1. That is, the count of elements in the third row vector may be one. The processing device 120A may then complement the second row vector and the third row vector by adding elements such that the count of elements in the each row vector in the specific layer is the same. Merely by way of example, the processing device 120A may add an element whose value is the coordinates of the grid B2 in the second row vector. The processing device 120A may add two elements whose values of the coordinates of the grid C1 as the second element and the third element in the third row vector. Accordingly, the count of elements in the each row vector in the specific layer may be three.

Figure 17B:
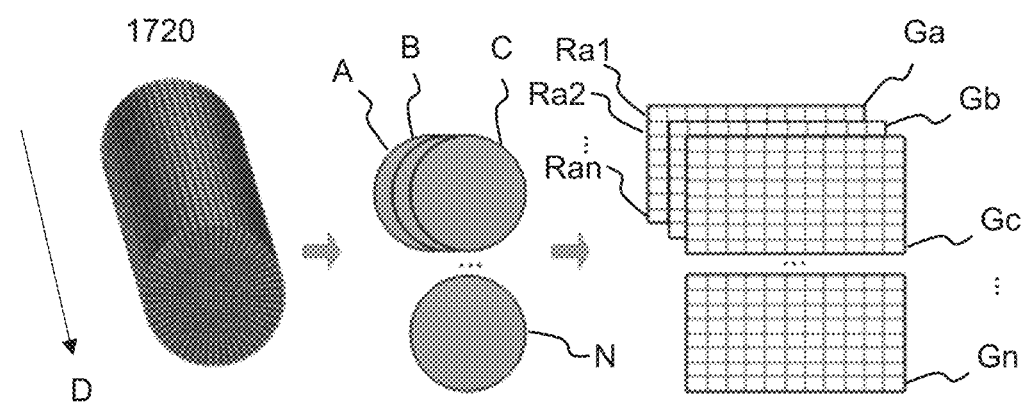
FIG. 17B is a schematic diagram illustrating an exemplary process for determining a mathematical expression corresponding to a structured volume grid model according to some embodiments of the present disclosure.

FIG. 17B is a schematic diagram illustrating an exemplary process for determining a mathematical expression corresponding to a structured volume grid model according to some embodiments of the present disclosure. As illustrated in FIG. 17B, the processing device 120A may divide a structured volume grid model 1720 into a plurality of layers, e.g., a first layer A, a second layer B, a third layer C, . . . , and a nth layer N, along an axial direction D of the structured volume grid model 1720. Each layer of the plurality of layers may include a plurality of rows of grids. For example, the first layer A may include a plurality of rows of grids Ga (e.g., a row Ra1, a row Ra2, . . . , a row Ran), the second layer B may include a plurality of rows of grids Gb, the third layer C may include a plurality of rows of grids Gc, . . . , and the nth layer may include a plurality of rows of grids Gn.

For the first layer A, the processing device 120A may determine a row vector Va1 corresponding to the row Ra1 based on coordinate information of the plurality of grids Ga of the row Ra1, a row vector Va2 corresponding to the row Ra2 based on coordinate information of the plurality of grids Ga of the row Ra2, . . . , and a row vector Van corresponding to the row Ran based on coordinate information of the plurality of grids Ga of the row Ran. Merely by way of example with reference to the determination of the row vector Va1 corresponding to the row Ra1, if coordinates of a first grid of the row Ra1 are (X1, Y1, Z1), coordinates of a second grid of the row Ra1 are (X2, Y2, Z2), coordinates of a third grid of the row Ra1 are (X3, Y3, Z3), . . . , and coordinates of a nth grid of the row Ra1 are (Xn, Yn, Zn), the processing device 120A may determine that the row vector Va1 corresponding to the row Ra1 is ((X1, Y1, Z1), (X2, Y2, Z2), (X3, Y3, Z3), . . . , (Xn, Yn, Zn)). The processing device 120A may then determine a layer vector matrix Va corresponding to the first layer A based on the row vector Va1, the row vector Va2, . . . , and the row vector Van. Merely by way of example, the processing device 120A may determine that the layer vector matrix Va corresponding to the first layer A is (Va1, Va2, . . . , Van). Similarly, the processing device 120A may determine a layer vector matrix Vb corresponding to the second layer B, a layer vector matrix Vc corresponding to the third layer C, . . . , and a layer vector matrix Vn corresponding to the nth layer N. Further, the processing device 120A may determine a vector matrix corresponding to the structured volume grid model 1720 based on the layer vector matrix Va, the layer vector matrix Vb, the layer vector matrix Vc, . . . , and the layer vector matrix Vn. Merely by way of example, the processing device 120A may determine that vector matrix corresponding to the structured volume grid model 1720 is (Va, Vb, Vc, . . . , Vn).

According to some embodiments of the present disclosure, a mathematical expression (e.g., an array, a vector, a vector matrix) corresponding to a blood vessel model may be determined based on coordinate information of a plurality of grids of the blood vessel model. Compared with an approach that uses pixel values of grids of a blood vessel model to determine a mathematical expression corresponding to the blood vessel model, the systems and methods disclosed herein may improve the accuracy of the mathematical expression corresponding to the blood vessel model by using the coordinate information of the plurality of grids of the blood vessel model, which may further improve the accuracy of the blood vessel parameter of the target blood vessel determined based thereon.

It should be noted that the above description regarding the process 1300 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 18:
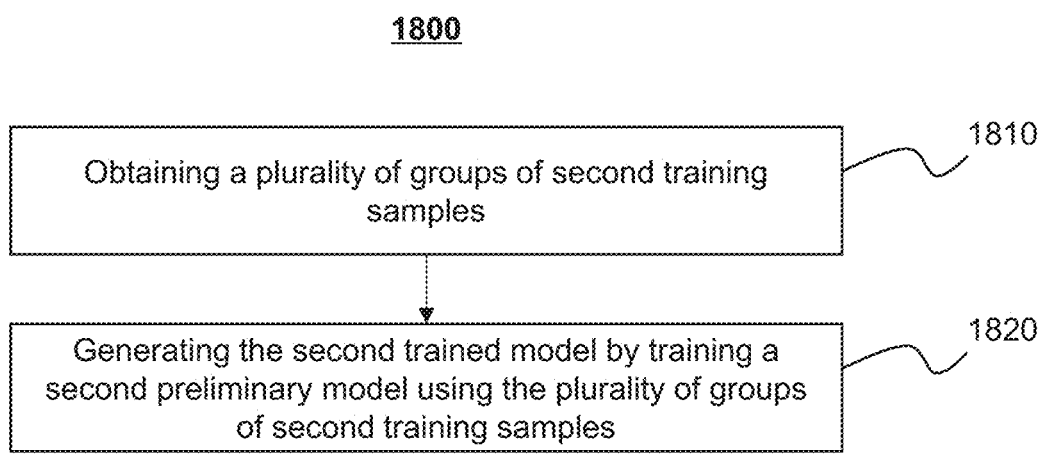
FIG. 18 is a flowchart illustrating an exemplary process for generating a second trained model according to some embodiments of the present disclosure.

FIG. 18 is a flowchart illustrating an exemplary process for generating a second trained model according to some embodiments of the present disclosure. In some embodiments, the process 1800 may be implemented in the medical system 100 illustrated in FIG. 1. For example, the process 1800 may be stored in the storage device 130 and/or the storage (e.g., the storage 220, the storage 390) as a form of instructions, and invoked and/or executed by the processing device 120B (e.g., the processor 210 of the computing device 200 as illustrated in FIG. 2, the CPU 340 of the mobile device 300 as illustrated in FIG. 3). The operations of the illustrated process presented below are intended to be illustrative. In some embodiments, the process 1800 may be accomplished with one or more additional operations not described, and/or without one or more of the operations discussed. Additionally, the order in which the operations of the process 1800 as illustrated in FIG. 18 and described below is not intended to be limiting.

In 1810, the processing device 120B (e.g., the obtaining module 440) may obtain a plurality of groups of second training samples.

In some embodiments, each group of the plurality of groups of second training samples may include a sample mathematical expression corresponding to a sample blood vessel model of a sample blood vessel and at least one reference blood vessel parameter of the sample blood vessel. For example, the processing device 1206 may obtain a sample blood vessel image of the sample blood vessel. The processing device 120B may then determine, based on the sample blood vessel image, a sample blood vessel model of the sample blood vessel. The processing device 1206 may further determine a sample mathematical expression corresponding to the sample blood vessel model. The determination of the sample mathematical expression corresponding to the sample blood vessel model may be performed in a similar manner as the determination of a mathematical expression corresponding to a blood vessel model as described in connection with operation 1210 in FIG. 12, operations 1310 and 1320 in FIG. 13, the descriptions of which are not repeated here.

In some embodiments, the processing device 120B may determine the at least one reference blood vessel parameter of the sample blood vessel based on the sample blood vessel model and at least one sample blood flow parameter of the sample blood vessel according to a second predetermined algorithm. In some embodiments, the second predetermined algorithm includes a computational fluid dynamics algorithm. More descriptions of the determination of the at least one reference blood vessel parameter of the sample blood vessel may be found elsewhere in the present disclosure (e.g., operation 910 in FIG. 9, and the descriptions thereof).

In 1820, the processing device 120B (e.g., the trained model generation module 450) may generate a second trained model by training a second preliminary model using the plurality of groups of second training samples.

In some embodiments, the processing device 120B may initialize one or more parameter values of one or more second parameters in the second preliminary model. Exemplary second parameters in the second preliminary model may include a size of a kernel of a layer, a total count (or number) of layers, a count (or number) of nodes in each layer, a learning rate, a batch size, an epoch, a connected weight between two connected nodes, a bias vector relating to a node, or the like. In some embodiments, the initialized values of the second parameters may be default values determined by the medical system 100 or preset by a user of the medical system 100. In some embodiments, the processing device 120B may obtain the second preliminary model from a storage device (e.g., the storage device 130) of the medical system 100 and/or an external storage device via the network 150.

In some embodiments, the second trained model may be determined by training second preliminary model using the plurality of groups of second training samples. One or more parameter values of the plurality of second parameters may be altered during the training of the second preliminary model using the plurality of groups of second training samples. In some embodiments, the second preliminary model may be trained based on the plurality of groups of second training samples using a training algorithm. Exemplary training algorithms may include a gradient descent algorithm, a Newton's algorithm, a Quasi-Newton algorithm, a Levenberg-Marquardt algorithm, a conjugate gradient algorithm, a generative adversarial learning algorithm, or the like.

In some embodiments, the second trained model may be determined by performing a plurality of iterations to iteratively update one or more parameter values of the plurality of second parameters of the second preliminary model. For each of the plurality of iterations, a specific group of second training samples may first be input into the second preliminary model. For example, a specific sample mathematical expression corresponding to a sample blood vessel model in a specific group of second training samples may be inputted into an input layer of the second preliminary model, and a reference blood vessel parameter corresponding to the specific sample mathematical expression may be inputted into an output layer of the second preliminary model as a desired output of the second preliminary model. The second preliminary model may determine a predicted output (i.e., a sample blood vessel parameter) of the specific group of second training samples. The predicted output (i.e., the sample blood vessel parameter) of the specific group of second training samples may then be compared with the reference blood vessel parameter of the specific group of second training samples based on a cost function. If a value of the cost function exceeds a threshold in a current iteration, parameter values of the second preliminary model may be adjusted and/or updated in order to decrease the value of the cost function (i.e., the difference between the sample blood vessel parameter and the reference blood vessel parameter) to smaller than the threshold, and an intermediate model may be generated. Accordingly, in the next iteration, another group of second training samples may be input into the intermediate model to train the intermediate model as described above. The plurality of iterations may be performed to update the parameter values of the second preliminary model (or the intermediate model) until a termination condition is satisfied. If the termination condition is satisfied in a current iteration, the processing device 120B may designate the second preliminary model (or the intermediate model) obtained in the current iteration as the second trained model. In some embodiments, the training of the second trained model may be performed in a similar manner as the training of the first trained model as described in connection with FIG. 9, the descriptions of which are not repeated here.

It should be noted that the above description regarding the process 1800 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, the first trained model (or the second trained model) may be updated from time to time, e.g., periodically or not, based on a sample set that is at least partially different from an original sample set from which an original first trained model (or an original second trained model) is determined. For instance, the first trained model (or the second trained model) may be updated based on a sample set including new samples that are not in the original sample set, samples processed using the model in connection with the original trained model of a prior version, or the like, or a combination thereof. In some embodiments, the determination and/or updating of the first trained model (or the second trained model) may be performed on a processing device, while the application of the first trained model (or the second trained model) may be performed on a different processing device. In some embodiments, the determination and/or updating of the first trained model (or the second trained model) may be performed on a processing device of a system different than the medical system 100 or a server different than a server including the processing device 120 on which the application of the first trained model (or the second trained model) is performed. For instance, the determination and/or updating of the first trained model (or the second trained model) may be performed on a first system of a vendor who provides and/or maintains such a machine learning model and/or has access to training samples used to determine and/or update the first trained model (or the second trained model), while blood vessel parameters determination based on the provided machine learning model may be performed on a second system of a client of the vendor. In some embodiments, the determination and/or updating of the first trained model (or the second trained model) may be performed online in response to a request for determining blood vessel parameters. In some embodiments, the determination and/or updating of the first trained model (or the second trained model) may be performed offline.

Figure 19:
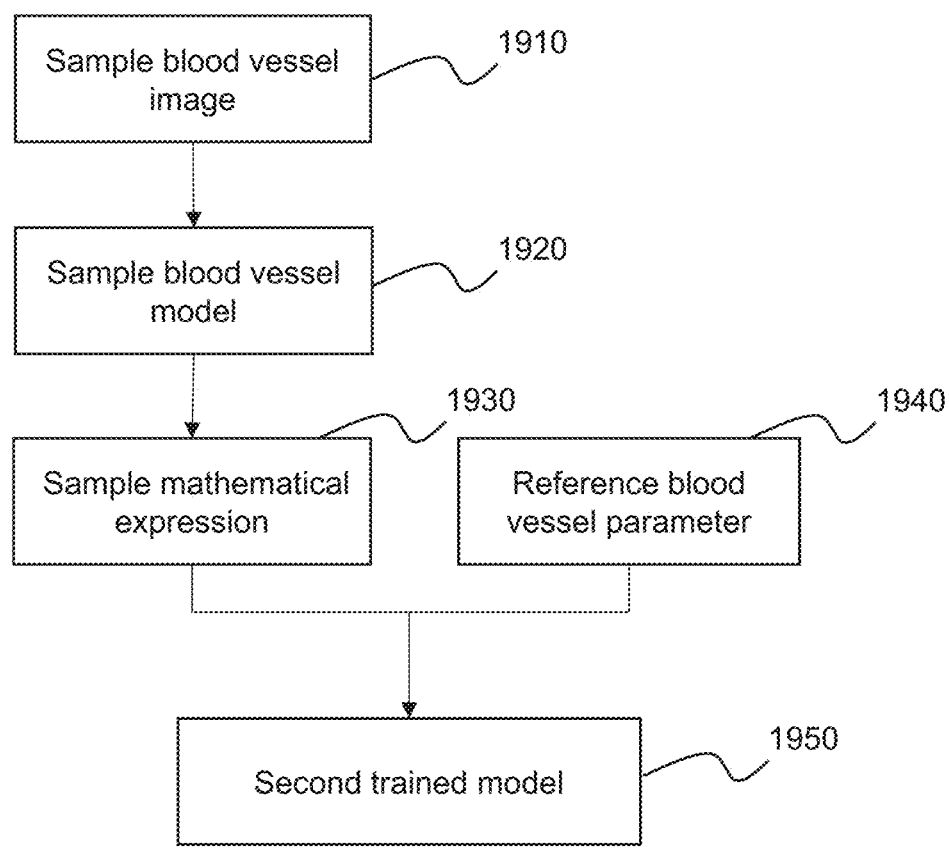
FIG. 19 is a schematic diagram illustrating an exemplary process for generating a second trained model according to some embodiments of the present disclosure.

FIG. 19 is a schematic diagram illustrating an exemplary process for generating a second trained model according to some embodiments of the present disclosure.

As illustrated in FIG. 19, in 1910, the processing device 120B may obtain a sample blood vessel image of a sample blood vessel as described in connection with operation 1810. For example, the processing device 120B may determine a portion of a sample original image including the sample blood vessel as the sample blood vessel image. In 1920, the processing device 120B may determine a sample blood vessel model of the sample blood vessel based on the sample blood vessel image as described in connection with operation 1810. In 1930, the processing device 120B may obtain a sample mathematical expression corresponding to the sample blood vessel model of the sample blood vessel as described in connection with operation 1910. For example, the processing device 120B may determine the mathematical expression corresponding to the blood vessel model by performing a numerical processing operation on the blood vessel model.

In 1940, the processing device 120B may determine at least one reference blood vessel parameter of the sample blood vessel based on the sample blood vessel model and at least one sample blood flow parameter as described in connection with operation 1910. In 1950, the processing device 120B may generate a second trained model by training a second preliminary model based on the sample mathematical expression and the at least one reference blood vessel parameter of the sample blood vessel as described in connection with operation 1920.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities of ingredients, properties such as molecular weight, reaction conditions, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method, implemented on a computing device having at least one processor and at least one storage device, the method comprising:
   obtaining a blood vessel image of a target blood vessel;
   generating, based on the blood vessel image, a blood vessel model of the target blood vessel, wherein the blood vessel model is a grid model; and
   determining, based at least on the blood vessel model, at least one blood vessel parameter of the target blood vessel, including:
      obtaining at least one blood flow parameter of the target blood vessel; and
      determining, based on the blood vessel model and the at least one blood flow parameter, the at least one blood vessel parameter of the target blood vessel using a first trained model;
   wherein the first trained model is obtained according to a training process including:
      obtaining a plurality of groups of first training samples, wherein each group of the plurality of groups of first training samples includes a preprocessed sample blood vessel model of a sample blood vessel and at least one reference blood vessel parameter of the sample blood vessel; and
      generating the first trained model by training a first preliminary model using the plurality of groups of first training samples.

2. The method of claim 1, wherein the generating, based on the blood vessel image, a blood vessel model of the target blood vessel comprises:
   determining at least one model parameter of the blood vessel model based on feature information of the target blood vessel; and
   generating the blood vessel model by performing, based on the at least one model parameter, a grid division on the blood vessel image.

3. The method of claim 1, wherein the determining, based on the blood vessel model and the at least one blood flow parameter, the at least one blood vessel parameter of the target blood vessel using a first trained model comprises:
   obtaining at least one first grid node and at least one second grid node of the blood vessel model;
   determining, based on the at least one blood flow parameter, an initial value of the at least one first grid node;
   determining, based on a preset value, an initial value of the at least one second grid node;
   generating a preprocessed blood vessel model by preprocessing, based on the initial value of the at least one first grid node and the initial value of the at least one second grid node, the blood vessel model; and
   determining, based on the preprocessed blood vessel model, the at least one blood vessel parameter of the target blood vessel using the first trained model.

4. The method of claim 1, wherein the first trained model is a graph neural network model.

5. The method of claim 1, wherein the blood flow parameter includes at least one of a blood density, a blood viscosity, an average blood flow velocity, an average blood flow volume, a blood pressure, or a cardiac output.

6. The method of claim 1, wherein the obtaining a plurality of groups of first training samples comprises:
   for each group of the plurality of groups of first training samples,
      obtaining a sample blood vessel image of the sample blood vessel;
      determining, based on the sample blood vessel image, a sample blood vessel model of the sample blood vessel;
      obtaining at least one sample blood flow parameter of the sample blood vessel; and
      generating the preprocessed sample blood vessel model by preprocessing, based on the at least one sample blood flow parameter, the sample blood vessel model.

7. A system, comprising:
   at least one storage device storing executable instructions, and
   at least one processor in communication with the at least one storage device, wherein when executing the executable instructions, the at least one processor causes the system to perform operations including:
   obtaining a blood vessel image of a target blood vessel;
   generating, based on the blood vessel image, a blood vessel model of the target blood vessel, wherein the blood vessel model is a grid model; and
   determining, based at least on the blood vessel model, at least one blood vessel parameter of the target blood vessel, including:
      determining a mathematical expression corresponding to the blood vessel model; and
      determining, based on the mathematical expression, the at least one blood vessel parameter of the target blood vessel using a second trained model;
   wherein the second trained model is obtained according to a training process including:
      obtaining a plurality of groups of second training samples, wherein each group of the plurality of groups of second training samples includes a sample mathematical expression corresponding to a sample blood vessel model of a sample blood vessel and at least one reference blood vessel parameter of the sample blood vessel; and
      generating the second trained model by training a second preliminary model using the plurality of groups of second training samples.

8. The system of claim 7, wherein the determining a mathematical expression corresponding to the blood vessel model comprises:
   determining the mathematical expression corresponding to the blood vessel model by performing a numerical processing operation on the blood vessel model.

9. The system of claim 7, wherein the blood vessel model is a structured grid model, and the determining a mathematical expression corresponding to the blood vessel model comprises:
   dividing the structured grid model into at least one first layer along an axial direction of the blood vessel model, the at least one first layer including a plurality of first grids; and
   determining the mathematical expression based on first coordinate information of the plurality of first grids of the at least one first layer.

10. The system of claim 9, wherein the blood vessel model is a structured surface grid model, and the determining the mathematical expression based on first coordinate information of the plurality of first grids of the at least one first layer comprises:
   for each of the at least one first layer, determining a layer vector corresponding to the first layer based on the first coordinate information of the plurality of first grids of the first layer; and determining a vector matrix corresponding to the blood vessel model based on at least one layer vector corresponding to the at least one first layer.

11. The system of claim 9, wherein the blood vessel model is a structured volume grid model, each first layer includes a plurality of rows of grids, and the determining the mathematical expression based on first coordinate information of the plurality of first grids of the at least one first layer comprises:

for each row of the plurality of rows in each first layer, determining a row vector corresponding to the row based on the first coordinate information of the plurality of first grids of the row;

for each first layer of the at least one first layer, determining a layer vector matrix corresponding to the first layer based on a plurality of row vectors corresponding to the plurality of rows in the first layer; and determining a vector matrix corresponding to the blood vessel model based on at least one layer vector matrix corresponding to the at least one first layer.

12. The system of claim 7, wherein the blood vessel model is an unstructured grid model, and the determining a mathematical expression corresponding to the blood vessel model comprises:

mapping the unstructured grid model to a structured grid model;

dividing the structured grid model into at least one second layer along an axial direction of the structured grid model, the at least one second layer including a plurality of second grids; and determining the mathematical expression based on second coordinate information of the plurality of second grids of the at least one second layer.

13. The system of claim 7, wherein the blood vessel model is an unstructured grid model, the unstructured grid model includes a plurality of third grids, and the determining a mathematical expression corresponding to the blood vessel model comprises:

determining the mathematical expression based on third coordinate information of the plurality of thirdgrids.

14. The system of claim 7, wherein the determining, based on the mathematical expression, the at least one blood vessel parameter of the target blood vessel using a second trained model comprises:

determining the at least one blood vessel parameter of the target blood vessel by inputting the mathematical expression into the second trained model.

15. The system of claim 7, wherein the determining, based on the mathematical expression, the at least one blood vessel parameter of the target blood vessel using a second trained model comprises:

obtaining at least one blood flow parameter of the target blood vessel; and determining the at least one blood vessel parameter of the target blood vessel by inputting the mathematical expression and the at least one blood flow parameter into the second trained model.

16. A non-transitory computer readable medium, comprising at least one set of instructions, wherein when executed by one or more processors of a computing device, the at least one set of instructions causes the computing device to perform a method, the method comprising:

obtaining a blood vessel image of a target blood vessel;

generating, based on the blood vessel image, a blood vessel model of the target blood vessel, wherein the blood vessel model is a grid model; and determining, based at least on the blood vessel model, at least one blood vessel parameter of the target blood vessel, including:

obtaining at least one blood flow parameter of the target blood vessel; and determining, based on the blood vessel model and the at least one blood flow parameter, the at least one blood vessel parameter of the target blood vessel using a first trained model;

wherein the first trained model is obtained according to a training process including:

obtaining a plurality of groups of first training samples, wherein each group of the plurality of groups of first training samples includes a preprocessed sample blood vessel model of a sample blood vessel and at least one reference blood vessel parameter of the sample blood vessel; and generating the first trained model by training a first preliminary model using the plurality of groups of first training samples.

* * * * *